US012659733B2

(12) United States Patent
Lee et al.

(10) Patent No.: US 12,659,733 B2
(45) Date of Patent: Jun. 16, 2026

(54) AMBIENT INTERNET OF THINGS SECURITY ARCHITECTURE

(71) Applicant: QUALCOMM Incorporated, San Diego, CA (US)

(72) Inventors: Soo Bum Lee, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 18/469,741

(22) Filed: Sep. 19, 2023

(65) Prior Publication Data

US 2025/0097698 A1 Mar. 20, 2025

(51) Int. Cl.
| | |
|---|---|
| *H04L 9/32* | (2006.01) |
| *H04W 12/0431* | (2021.01) |
| *H04W 12/0433* | (2021.01) |
| *H04W 12/06* | (2021.01) |

(52) U.S. Cl.
CPC ... *H04W 12/0433* (2021.01); *H04W 12/0431* (2021.01); *H04W 12/06* (2013.01)

(58) Field of Classification Search
CPC ......... H04W 12/0433; H04W 12/0431; H04W 12/06; H04W 4/50; H04W 12/041; H04W 4/70; H04W 12/02; H04W 4/80; H04W 12/04; H04W 12/069; H04L 63/0807; H04L 9/3213
See application file for complete search history.

(56) References Cited

U.S. PATENT DOCUMENTS

2023/0034512 A1* 2/2023 Rabiah .................... H04L 63/12

FOREIGN PATENT DOCUMENTS

| CN | 108323229 B | * | 1/2021 | .............. H04L 7/52 |
| WO | 2023116735 A1 | | 6/2023 | |

OTHER PUBLICATIONS

3GPP TR 22.840 v1.3.0: "TR 22.840 v1.3.0 Study on Ambient power-enabled Internet of Things", S1-232590, 3rd Generation Partnership Project, Mobile Competence Centre, 650, Route Des Lucioles, F-06921, Sophia-Antipolis Cedex, France, vol. SA WG1, No. Goteborg, SE, Aug. 21, 2023-Aug. 25, 2023, Sep. 5, 2023, 128 Pages, XP052502529, p. 22, "5.3.3 Service Flows" p. 61, fourth paragraph p. 72, "5.22.3 Service Flows".
International Search Report and Written Opinion—PCT/US2024/046235—ISA/EPO—Nov. 29, 2024.

* cited by examiner

*Primary Examiner* — Izunna Okeke
(74) *Attorney, Agent, or Firm* — Polsinelli LLP

(57) ABSTRACT

Systems and techniques are provided for wireless communication. For example, a process may include receiving, from a provisioning service, a shared credential, wherein the shared credential is shared between a device and an application function; generating tag information; encoding a portion of the tag information based on the shared credential to generate encoded tag information; and broadcasting the encoded tag information.

30 Claims, 12 Drawing Sheets

900

Receive, From A Provisioning Service, A Shared Credential, Wherein The Shared Credential Is Shared Between The Device And An Application Function
902

Generate Tag Info, Wherein The Shared Credential Comprises A Token, Wherein The Token Is Included In The Tag Info, And Wherein The Tag Information Is Encoded Based On A Public Key Of An Issuer Of The Token
904

Encode A Portion Of The Tag Information Based On The Shared Credential To Generate Encoded Tag Info
906

Broadcast The Encoded Tag Information
908

900

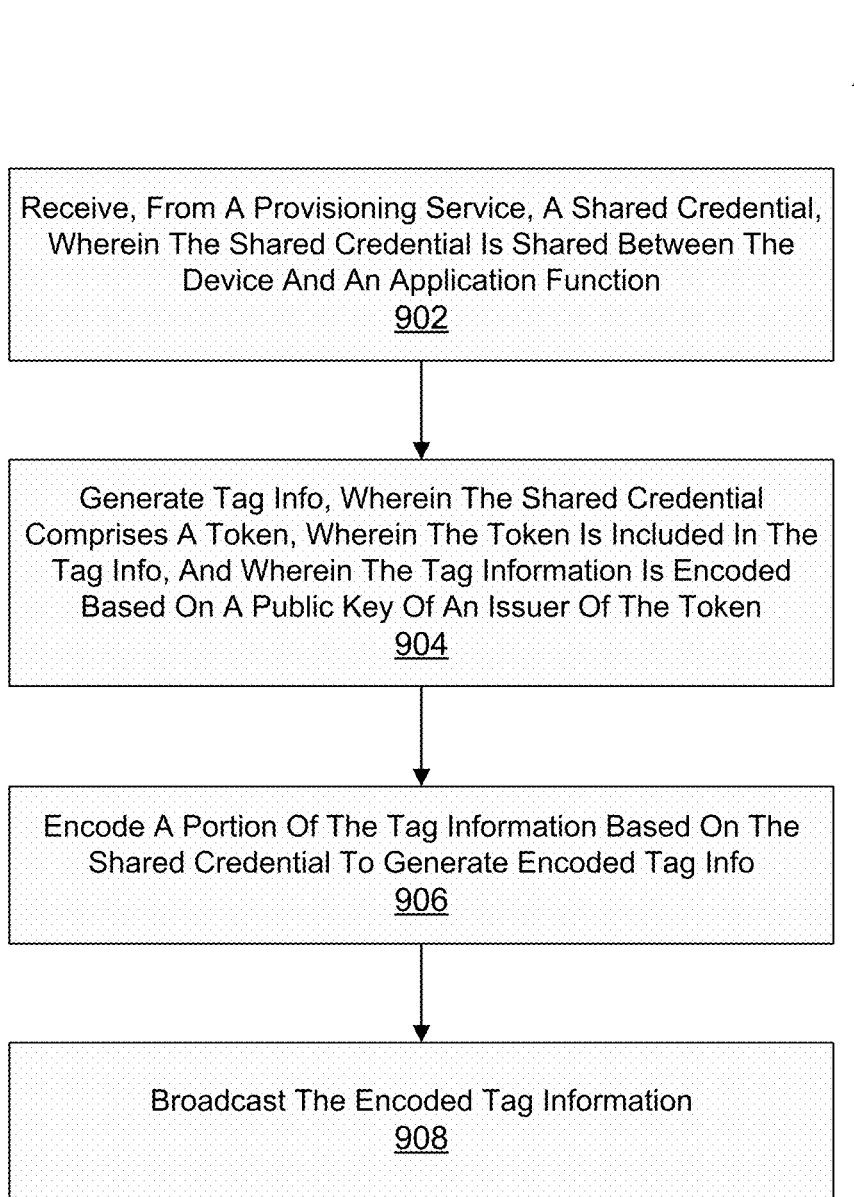

Receive, From A Provisioning Service, A Shared Credential, Wherein The Shared Credential Is Shared Between The Device And An Application Function
902

Generate Tag Info, Wherein The Shared Credential Comprises A Token, Wherein The Token Is Included In The Tag Info, And Wherein The Tag Information Is Encoded Based On A Public Key Of An Issuer Of The Token
904

Encode A Portion Of The Tag Information Based On The Shared Credential To Generate Encoded Tag Info
906

Broadcast The Encoded Tag Information
908

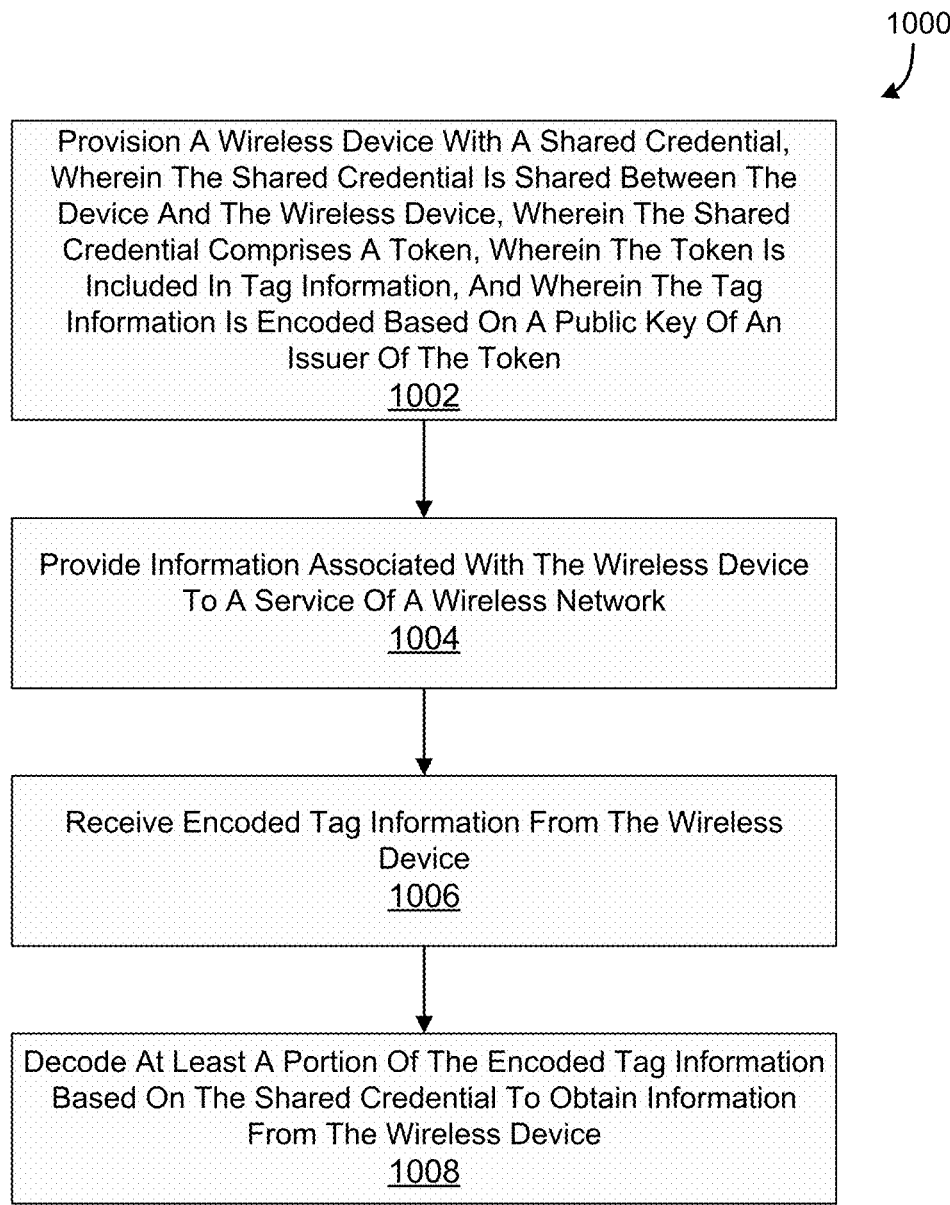

Provision A Wireless Device With A Shared Credential,
Wherein The Shared Credential Is Shared Between The
Device And The Wireless Device, Wherein The Shared
Credential Comprises A Token, Wherein The Token Is
Included In Tag Information, And Wherein The Tag
Information Is Encoded Based On A Public Key Of An
Issuer Of The Token
1002

Provide Information Associated With The Wireless Device
To A Service Of A Wireless Network
1004

Receive Encoded Tag Information From The Wireless
Device
1006

Decode At Least A Portion Of The Encoded Tag Information
Based On The Shared Credential To Obtain Information
From The Wireless Device
1008

Receive Information Associated With A Wireless Device From An Application Function Coupled To Device
1102

Receive Encoded Tag Information From The Wireless Device
1104

Verify The Wireless Device Based On The Received Information Associated With The Wireless Device And The Encoded Tag Info
1106

AMBIENT INTERNET OF THINGS SECURITY ARCHITECTURE

FIELD

Aspects of the present disclosure generally relate to wireless communications. For example, aspects of the present disclosure relate to an ambient Internet of Things (IoT) (e.g., "tags") security architecture.

INTRODUCTION

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a device for wireless communication is provided. The device includes a memory system and a processor system coupled to the memory system. The processor system is configured to: receive, from a provisioning service, a shared credential, wherein the shared credential is shared between the device and an application function, wherein the shared credential comprises a token, wherein the token is included in the tag information, and wherein the tag information is encoded based on a public key of an issuer of the token; generate tag information; encode a portion of the tag information based on the shared credential to generate encoded tag information; and broadcast the encoded tag information.

In another example, a device for wireless communication by an application function is provided. The device includes: a memory system comprising instructions; and a processor system coupled to the memory system. The processor system configured to: provision a wireless device with a shared credential, wherein the shared credential is shared between the device and the wireless device, wherein the shared credential comprises a token, wherein the token is included in the tag information, and wherein the tag information is encoded based on a public key of an issuer of the token; provide information associated with the wireless device to a service of a wireless network; receive encoded tag information from the wireless device; and decode at least a portion of the encoded tag information based on the shared credential to obtain tag information from the wireless device.

As another example, a device for wireless communications by a service of a wireless network is provided. The device includes: a memory system comprising instructions; and a processor system coupled to the memory system. The processor system configured to: receive information associated with a wireless device from an application function coupled to the device; receive encoded tag information from the wireless device; and verify the wireless device based on the received information associated with the wireless device and the encoded tag information.

In another example, a method for wireless communications is provided. The method includes: receiving, from a provisioning service, a shared credential, wherein the shared credential is shared between a device and an application function, wherein the shared credential comprises a token, wherein the token is included in the tag information, and wherein the tag information is encoded based on a public key of an issuer of the token; generating tag information; encoding a portion of the tag information based on the shared credential to generate encoded tag information; and broadcasting the encoded tag information.

As another example, a method for wireless communication by an application function is provided. The method includes: provisioning a wireless device with a shared credential, wherein the shared credential is shared between the device and the wireless device, wherein the shared credential comprises a token, wherein the token is included in the tag information, and wherein the tag information is encoded based on a public key of an issuer of the token; providing information associated with the wireless device to a service of a wireless network; receiving encoded tag information from the wireless device; and decoding at least a portion of the encoded tag information based on the shared credential to obtain tag information from the wireless device.

In another example, a method for wireless communications by a service of a wireless network is provided. The method includes: receiving information associated with a wireless device from an application function; receiving encoded tag information from the wireless device; and verifying the wireless device based on the received information associated with the wireless device and the encoded tag information.

As another example, a non-transitory computer-readable medium having stored thereon instructions is provided. The instructions, when executed by a processor system, cause the processor system to: receive, from a provisioning service, a shared credential, wherein the shared credential is shared between a device and an application function, wherein the shared credential comprises a token, wherein the token is included in the tag information, and wherein the tag information is encoded based on a public key of an issuer of the token; generate tag information; encode a portion of the tag information based on the shared credential to generate encoded tag information; and broadcast the encoded tag information In another example, a non-transitory computer-readable medium having stored thereon instructions is provided. The instructions, when executed by a processor system, cause the processor system to: provision a wireless device with a shared credential, wherein the shared credential is shared between the device and the wireless device, wherein the shared credential comprises a token, wherein the token is included in the tag information, and wherein the tag information is encoded based on a public key of an issuer of the token; provide information associated with the wireless device to a service of a wireless network; receive encoded tag information from the wireless device; and decode at least a portion of the encoded tag information based on the shared credential to obtain tag information from the wireless device.

As another example, a non-transitory computer-readable medium having stored thereon instructions is provided. The instructions, when executed by a processor system, cause the processor system to: receive information associated with a wireless device from an application function coupled to the device; receive encoded tag information from the wireless device; and verify the wireless device based on the received information associated with the wireless device and the encoded tag information.

In another example, an apparatus for wireless communications is provided. The apparatus includes: means for receiving, from a provisioning service, a shared credential, wherein the shared credential is shared between a device and an application function, wherein the shared credential comprises a token, wherein the token is included in the tag information, and wherein the tag information is encoded based on a public key of an issuer of the token; means for generating tag information; means for encoding a portion of the tag information based on the shared credential to generate encoded tag information; and means for broadcasting the encoded tag information.

As another example, an apparatus for wireless communication by an application function is provided. The apparatus includes: means for provisioning a wireless device with a shared credential, wherein the shared credential is shared between the device and the wireless device, wherein the shared credential comprises a token, wherein the token is included in the tag information, and wherein the tag information is encoded based on a public key of an issuer of the token; means for providing information associated with the wireless device to a service of a wireless network; means for receiving encoded tag information from the wireless device; and means for decoding at least a portion of the encoded tag information based on the shared credential to obtain tag information from the wireless device.

In another example, an apparatus for wireless communications by a service of a wireless network is provided. The apparatus includes: means for receiving information associated with a wireless device from an application function; means for receiving encoded tag information from the wireless device; and means for verifying the wireless device based on the received information associated with the wireless device and the encoded tag information.

Aspects generally include a method, apparatus, system, computer program product, non-transitory computer-readable medium, user equipment, base station, wireless communication device, and/or processing system as substantially described herein with reference to and as illustrated by the drawings and specification.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

FIG. 9 is a flow diagram illustrating an example of a process for wireless communications, in accordance with some examples;

FIG. 10 is a flow diagram illustrating another example of a process for wireless communications, in accordance with some examples;

DETAILED DESCRIPTION

Figure 1:
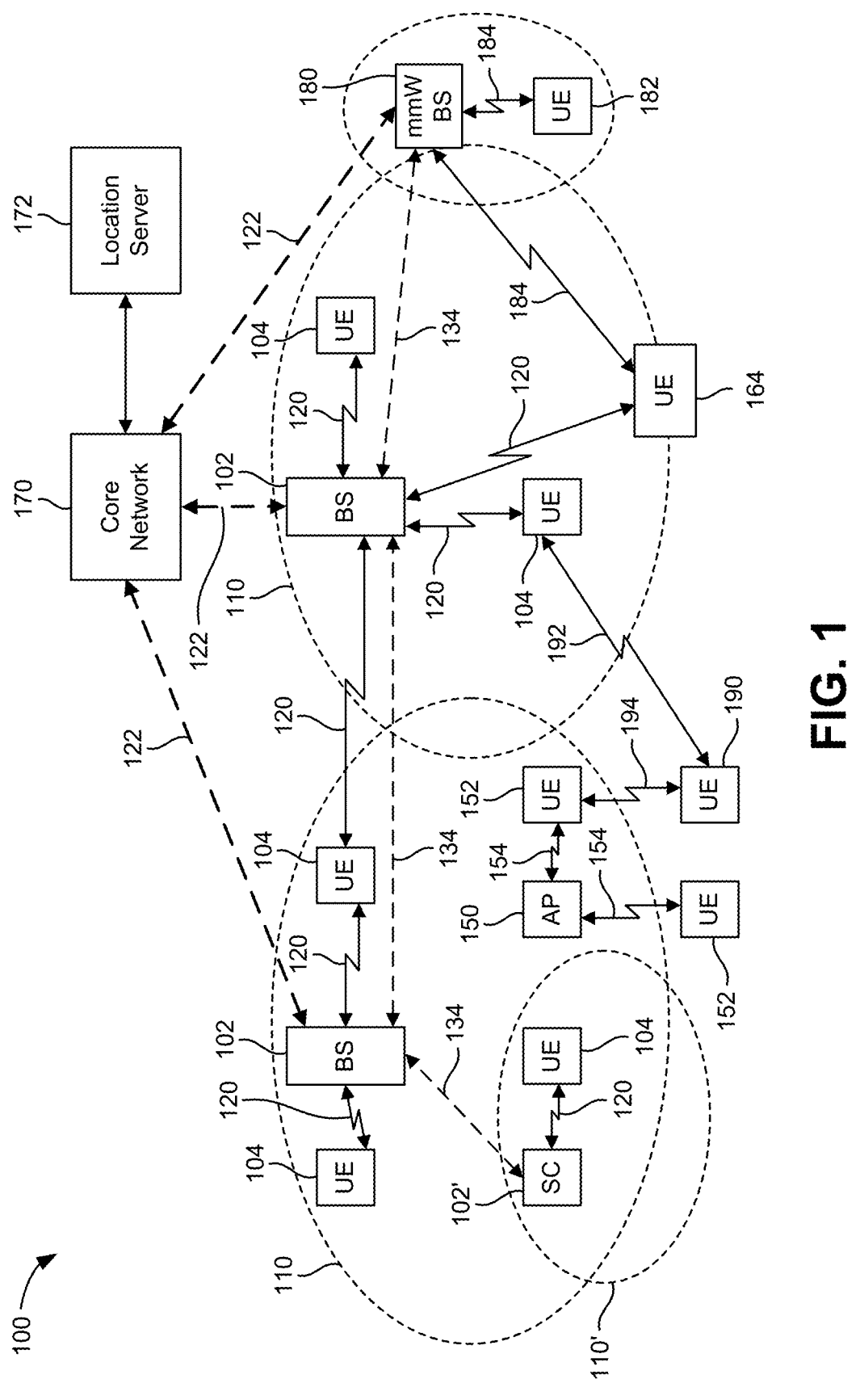
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In various wireless communication networks, client devices can be utilized that may be associated with different signaling and communication needs. For example, as 5G networks expand into industrial verticals and the quantity of deployed Internet-of-Things (IoT) devices grows, network service categories such as enhanced Mobile Broadband (eMBB), Ultra Reliable Low Latency Communications (URLLC), and massive Machine Type Communications (mMTC), etc., may be expanded to better support various IoT devices, which can include passive IoT devices, semi-passive IoT devices, etc.

For example, passive IoT devices and semi-passive IoT devices are relatively low-cost UEs that may be used to implement one or more sensing and communication capabilities in an IoT network or deployment. In some examples, passive and/or semi-passive IoT sensors (e.g., devices) can be used to provide sensing capabilities for various processes and use cases, such as asset management, logistics, warehousing, manufacturing, etc. Passive and semi-passive ambient IoT devices can include one or more sensors, a processor or micro-controller, and an energy harvester for generating electrical power from incident downlink radio frequency (RF) signals received at the passive or semi-passive ambient IoT device.

One application of ambient IoT devices includes tag devices (also referred to as a tag), which are often attached to items to be tracked. These tag devices are generally low-cost devices which may, upon detecting that the tag device is lost/misplaced, broadcast a message that may be received by reader devices. This message may include information (e.g., tag information) such as a tag identifier (e.g., tag ID), which may be some identifier that can be used to identify the tag, and metadata. However, broadcasting the message in the clear may allow for replay attacks, such as spamming or spoofing, to be performed. To provide a measure of security, an ambient IoT device may be provisioned with a credential, such as a key, alphanumeric string, code, etc., shared (e.g., shared credential) between the ambient IoT device and an application function of, or coupled to, a wireless network. The application function may be a functional element that provides service or application related information to network service consumers. Messages between the ambient IoT device and the application function may then be encoded using the shared credential. In some cases, the ambient IoT devices may not have a subscription to any mobile network operator and may not have a way to authenticate between the ambient IoT device and the mobile network operator. Thus, there is a desire for improved security for ambient IoT devices.

Systems, apparatuses, processes (also referred to as methods), and computer-readable media (collectively referred to as "systems and techniques") are described herein for an ambient IoT security architecture. In some cases, it may be useful to allow the mobile network operator to authenticate the ambient IoT device may be useful. As an example, the mobile network operator and/or data clearing house (if separate from the mobile network operator) may be configured to indirectly verify the ambient IoT tag information (e.g., tag info) by storing the tag information (e.g., tag ID and metadata) as they are received. In some cases, the data clearing house may be an electronic data collection/organization system that may be operated by the mobile operator, a service provider of the ambient IoT device, an owner of the ambient IoT device, or a third party. The application function associated with the ambient IoT device may then provide a list of encoded tag IDs (e.g., temp tag IDs, encrypted tag IDs, etc.) to the mobile network operator and/or data clearing house. Stored tag information (e.g., messages) having an encoded tag ID on the list of encoded tag IDs may be verified and provided to the application function. Stored tag information that does not match the list of encoded tag IDs may be discarded after a certain threshold period of time.

In other cases, it may be useful for the mobile network operator to directly verify the ambient IoT tag information. As an example, the application function may provide a tag verification key to the mobile network operator derived based on the shared credential. The ambient IoT device may use the tag verification key to encode the tag ID and/or portions of the tag information, and the mobile network operator may verify messages from the ambient IoT device based on the tag verification key. In another example, the application function may provide a list of valid encoded tag IDs to the mobile network operator (or data clearing house) and the mobile network operator may verify received messages from ambient IoT devices based on the list of valid encoded tag IDs. As another example, the mobile network operator (or data clearing house) may issue a token to the application function for the ambient IoT device. In such cases, the mobile network operator (or the data clearing house) can be referred to as an issuer of the token or a token issuer. The application function may provision the token to the ambient IoT device and the ambient IoT device may include the token in broadcast messages. The mobile network operator may then verify messages from the ambient IoT device based on the token.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the Ues can be connected with external networks such as the Internet and with other Ues. Of course, other mechanisms of connecting to the core network and/or the Internet are also possible for the Ues, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with Ues depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by Ues, including supporting data, voice, and/or signaling connections for the supported Ues. In some systems, a base station may provide edge node signaling functions while in other systems it may provide additional control and/or network management functions. A communication link through which Ues can send signals to a base station is called an uplink (UL) channel (e.g., a reverse traffic channel, a reverse control channel, an access channel, etc.). A communication link through which the base station can send signals to Ues is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of Ues, a network entity or base station may not support wireless access by Ues (e.g., may not support data, voice, and/or signaling connections for Ues), but may instead transmit reference signals to Ues to be measured by the Ues, and/or may receive and measure signals transmitted by the Ues. Such a base station may be referred to as a positioning beacon (e.g., when transmitting signals to Ues) and/or as a location measurement unit (e.g., when receiving and measuring signals from Ues).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of Ues. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 102 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., Ues, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHZ), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "Pcell," and the remaining carrier frequencies are referred to as "secondary carriers" or "secondary serving cells" or "Scells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a Pcell or an Scell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "Pcell") and other frequencies utilized by the macro cell base stations 102 and/or the mmW base station 180 may be secondary carriers ("Scells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the Pcell or the active carrier frequency, and "Receiver 1" would need to tune from band 'X' to band 'Y' (e.g., an Scell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a Pcell and one or more Scells for the UE 164 and the mmW base station 180 may support one or more Scells for the UE 164.

The wireless communications system 100 may further include one or more Ues, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
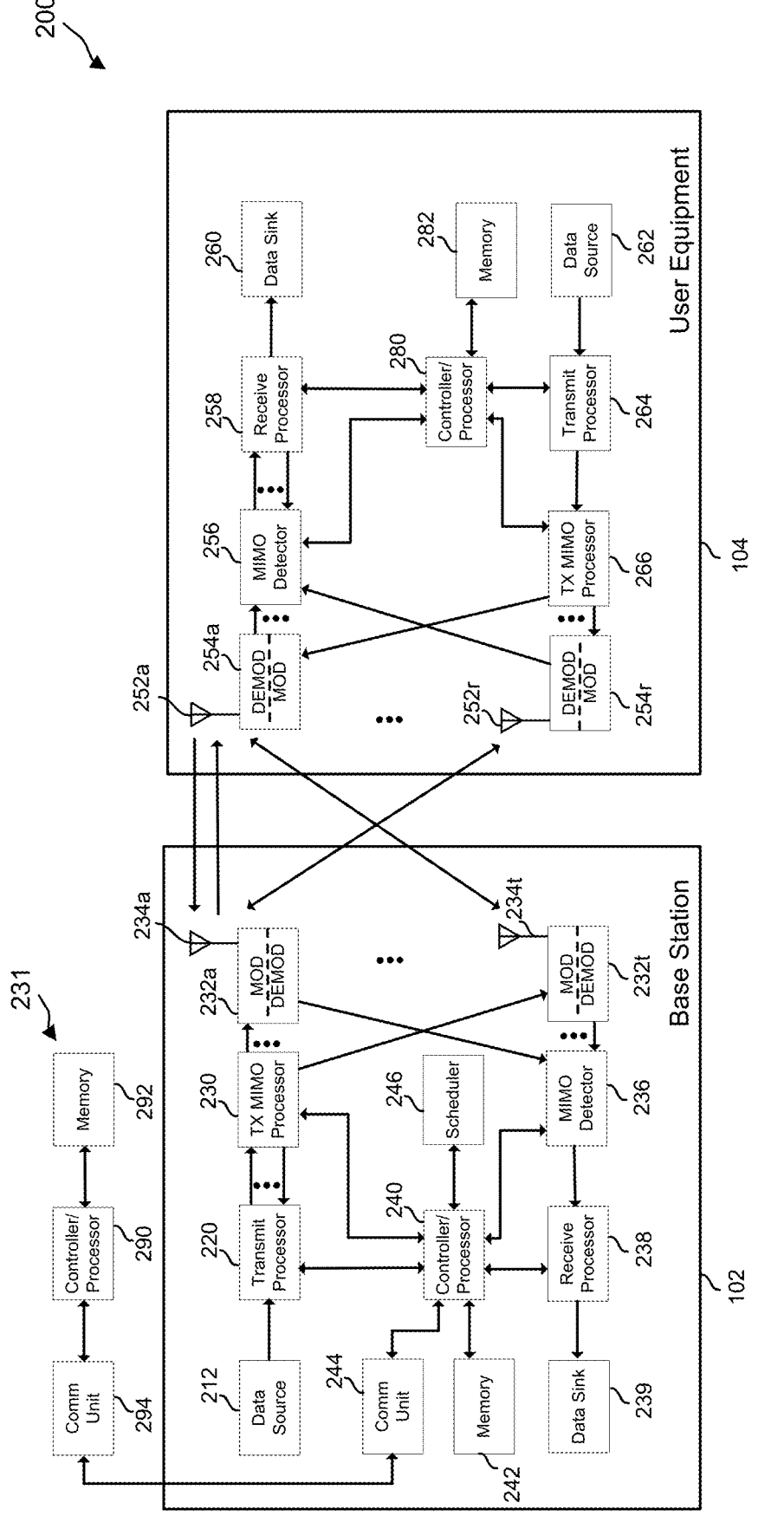
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more Ues, select one or more modulation and coding schemes (MCS) for each UE based on channel quality indicators (CQIs) received from the UE, process (e.g., encode and modulate) the data for each UE based on the MCS(s) selected for the UE, and provide data symbols for all Ues. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream (e.g., for an orthogonal frequency-division multiplexing (OFDM) scheme and/or the like) to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to one or more demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254a through 254r (e.g., for DFT-s-OFDM, CP-OFDM, and/or the like), and transmitted to base station 102. At base station 102, the uplink signals from UE 104 and other Ues may be received by antennas 234a through 234t, processed by demodulators 232a through 232t, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule Ues for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (Cus), one or more distributed units (Dus), or one or more radio units (Rus)). In some aspects, a CU may be implemented within a RAN node, and one or more Dus may be co-located with the CU, or alternatively, may be geographically or virtually distributed throughout one or multiple other RAN nodes. The Dus may be implemented to communicate with one or more Rus. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
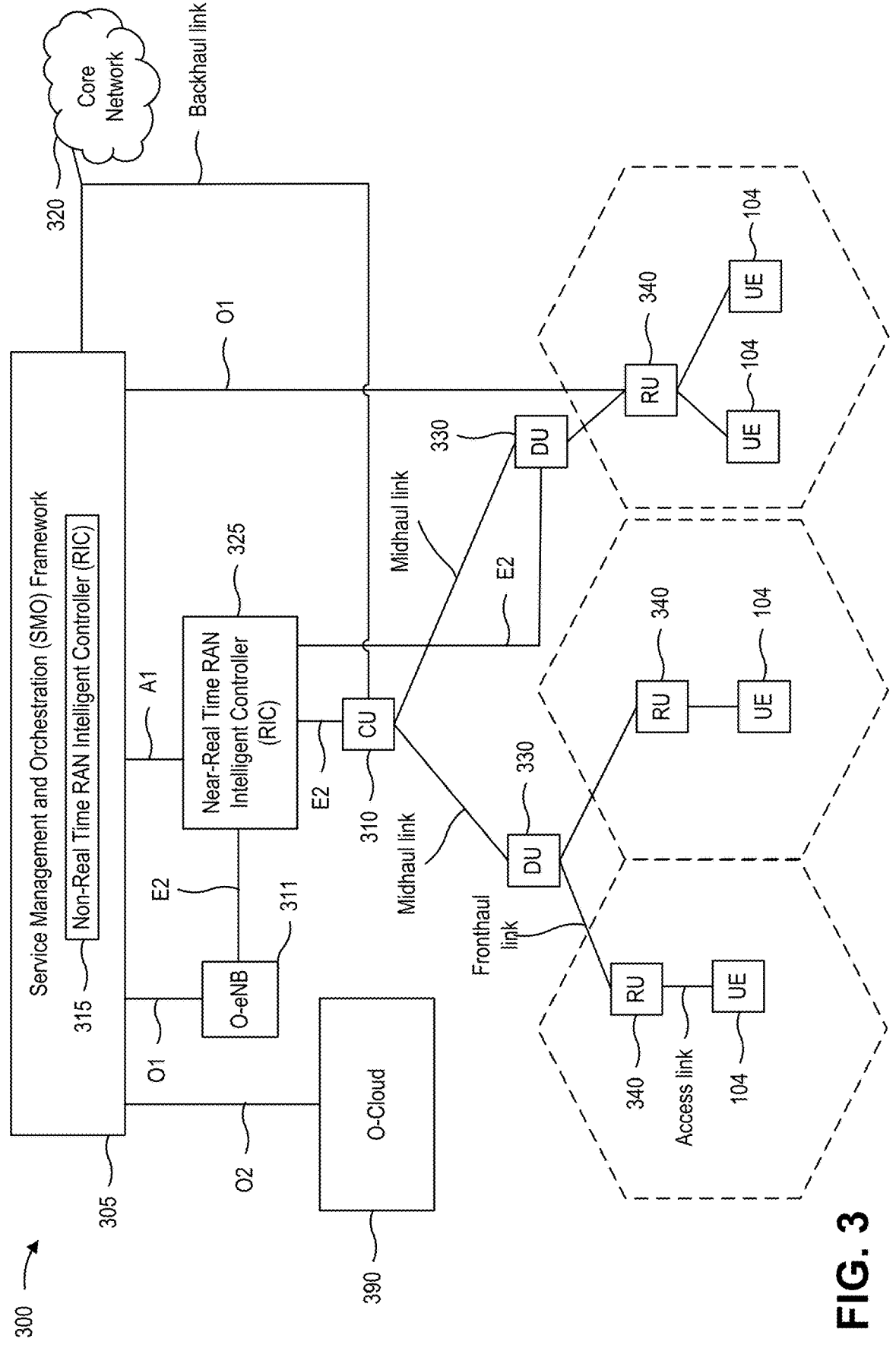
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (Cus) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUS 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more Rus 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
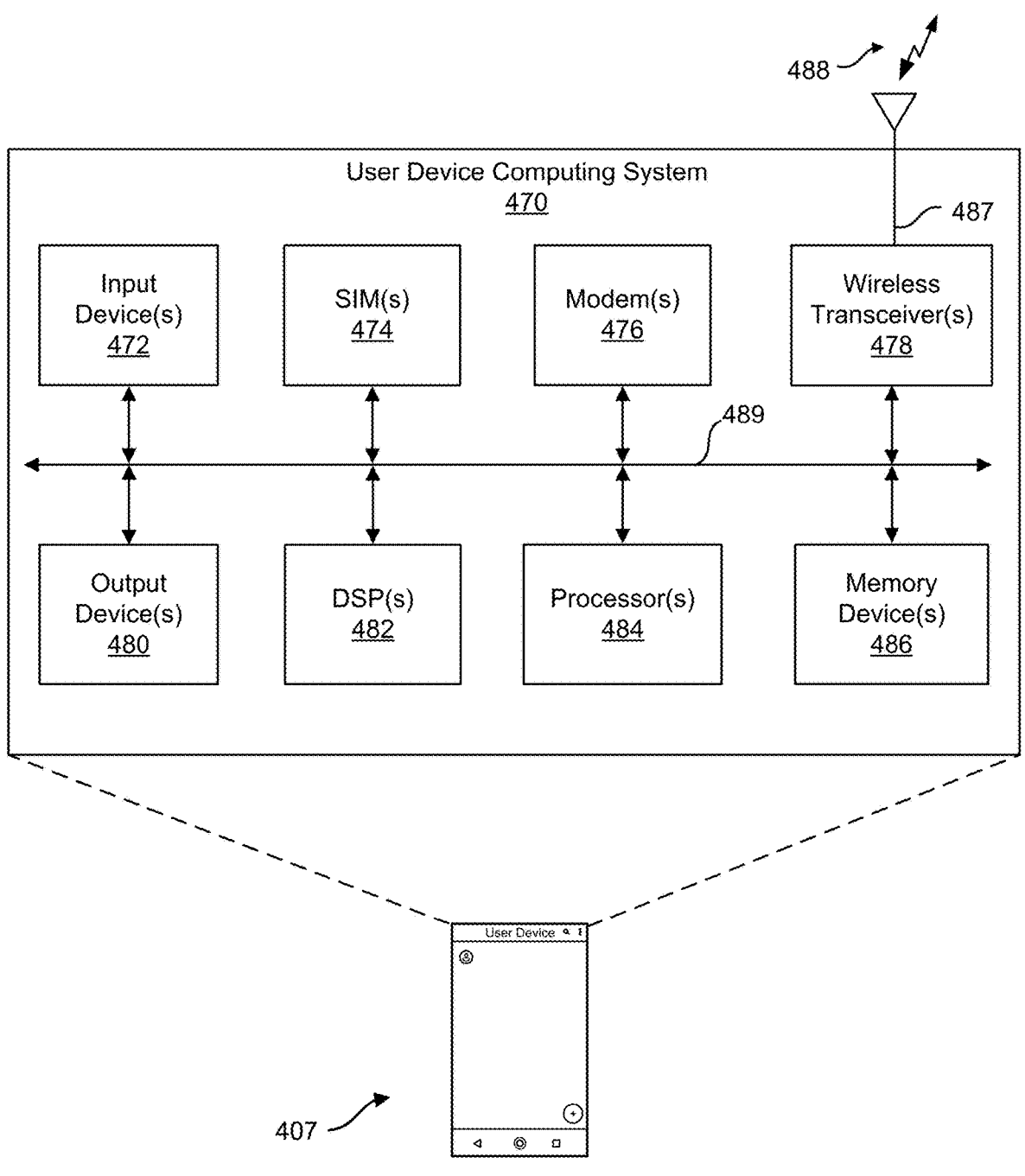
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICS, FPGAs, Aps, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (Aps) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 5:
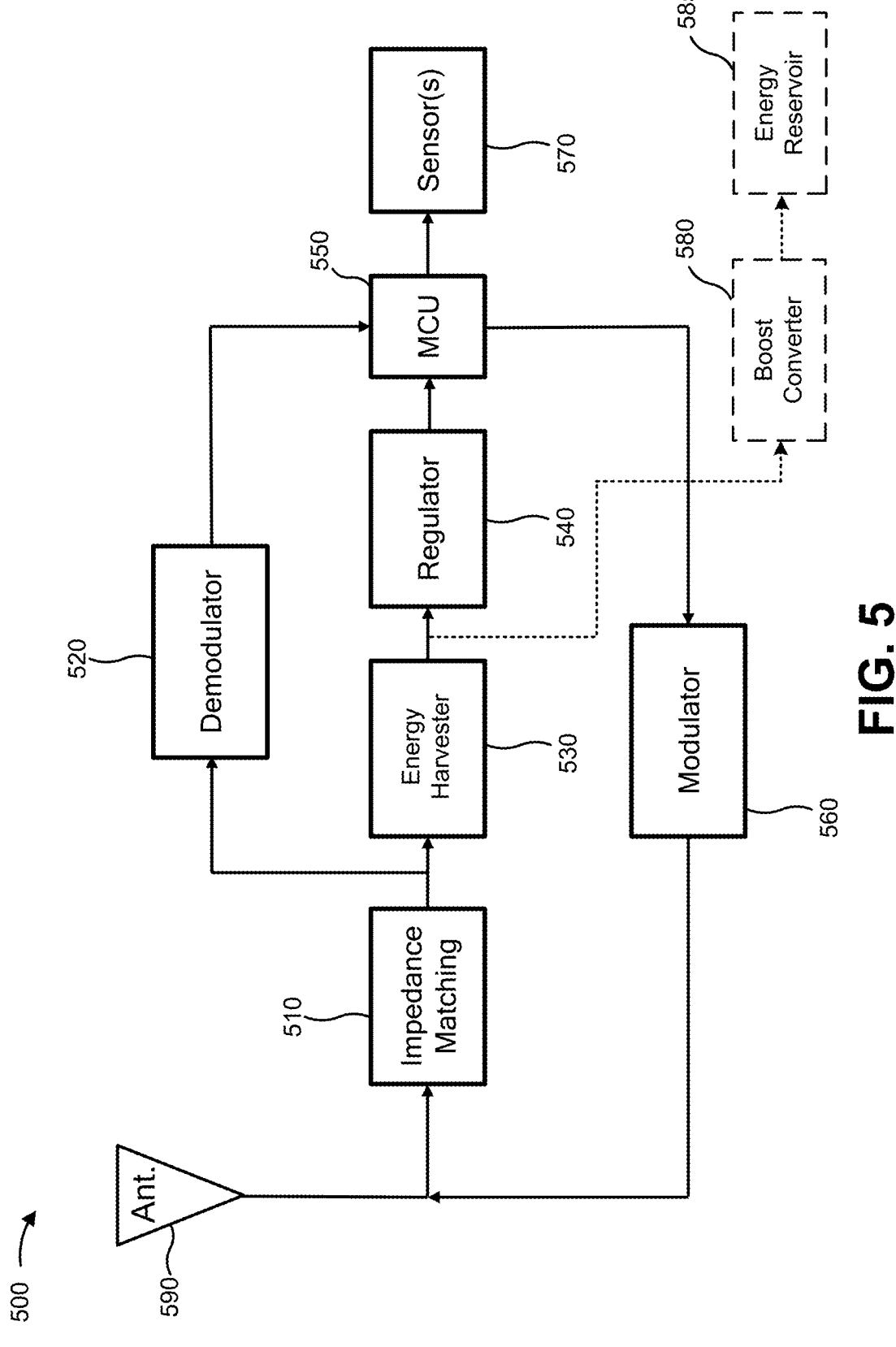
FIG. 5 is a diagram illustrating an example of a radio frequency (RF) energy harvesting device, in accordance with some examples.

FIG. 5 is a diagram illustrating an example of an architecture of a radio frequency (RF) energy harvesting device 500, in accordance with some examples. A RF energy harvesting device 500 may be a type of ambient IoT device. As will be described in greater depth below, the RF energy harvesting device 500 can harvest RF energy from one or more RF signals received using an antenna 590. As used herein, the term "energy harvesting" may be used interchangeably with "power harvesting." In some aspects, an "energy harvesting device" can be a device that is capable of performing energy harvesting (EH). For example, as used herein, the term "energy harvesting device" may be used interchangeably with the term "EH-capable device" or "energy harvesting-capable device." In some aspects, energy harvesting device 500 can be implemented as an Internet-of-Things (IoT) device, can be implemented as a sensor, etc., as will be described in greater depth below. In other examples, energy harvesting device 500 can be implemented as a Radio-Frequency Identification (RFID) tag or various other RFID devices.

The energy harvesting device 500 includes one or more antennas 590 that can be used to transmit and receive one or more wireless signals. For example, energy harvesting device 500 can use antenna 590 to receive one or more downlink signals and to transmit one or more uplink signals. An impedance matching component 510 can be used to match the impedance of antenna 590 to the impedance of one or more (or all) of the receive components included in energy harvesting device 500. In some examples, the receive components of energy harvesting device 500 can include a demodulator 520 (e.g., for demodulating a received downlink signal), an energy harvester 530 (e.g., for harvesting RF energy from the received downlink signal), a regulator 540, a micro-controller unit (MCU) 550, a modulator 560 (e.g., for generating an uplink signal). In some cases, the receive components of energy harvesting device 500 may further include one or more sensors 570.

The downlink signals can be received from one or more transmitters. For example, energy harvesting device 500 may receive a downlink signal from a network node or network entity that is included in a same wireless network as the energy harvesting device 500. In some cases, the network entity can be a base station, gNB, etc., that communicates with the energy harvesting device 500 using a cellular communication network. For example, the cellular communication network can be implemented according to the 3G, 4G, 5G, and/or other cellular standard (e.g., including future standards such as 6G and beyond).

In some cases, energy harvesting device 500 can be implemented as a passive or semi-passive energy harvesting device, which perform passive uplink communication by modulating and reflecting a downlink signal received via antenna 590. A passive or semi-passive energy harvesting device may also be referred to as a passive or semi-passive EH-capable device, respectively. For example, passive and semi-passive energy harvesting devices may be unable to generate and transmit an uplink signal without first receiving a downlink signal that can be modulated and reflected. In other examples, energy harvesting device 500 may be implemented as an active energy harvesting device, which utilizes a powered transceiver to perform active uplink communication. An active energy harvesting device is able to generate and transmit an uplink signal without first receiving a downlink signal (e.g., by using an on-device power source to energize its powered transceiver).

An active or semi-passive energy harvesting device (e.g., also referred to as an active EH-capable device or a semi-passive EH-capable device, respectively) may include one or more energy storage elements 585 (e.g., collectively referred to as an "energy reservoir"). For example, the one or more energy storage elements 585 can include batteries, capacitors, etc. In some examples, the one or more energy storage elements 585 may be associated with a boost converter 580. The boost converter 580 can receive as input at least a portion of the energy harvested by energy harvester 530 (e.g., with a remaining portion of the harvested energy being provided as instantaneous power for operating the energy harvesting device 500). In some aspects, the boost converter 580 may be a step-up converter that steps up voltage from its input to its output (e.g., and steps down current from its input to its output). In some examples, boost converter 580 can be used to step up the harvested energy generated by energy harvester 530 to a voltage level associated with charging the one or more energy storage elements 585. An active or semi-passive energy harvesting device may include one or more energy storage elements 585 and may include one or more boost converters 580. A quantity of energy storage elements 585 may be the same as or different than a quantity of boost converters 580 included in an active or semi-passive energy harvesting device.

A passive energy harvesting device (e.g., also referred to as a "passive EH-capable device") does not include an energy storage element 585 or other on-device power source. For example, a passive energy harvesting device may be powered using only RF energy harvested from a downlink signal (e.g., using energy harvester 530). As mentioned previously, a semi-passive energy harvesting device can include one or more energy storage elements 585 and/or other on-device power sources. The energy storage element 585 of a semi-passive energy harvesting device can be used to augment or supplement the RF energy harvested from a downlink signal. In some cases, the energy storage element 585 of a semi-passive energy harvesting device may store insufficient energy to transmit an uplink communication without first receiving a downlink communication (e.g., minimum transmit power of the semi-passive device>capacity of the energy storage element). An active energy harvesting device can include one or more energy storage elements 585 and/or other on-device power sources that can power uplink communication without using supplemental harvested RF energy (e.g., minimum transmit power of the active device <capacity of the energy storage element). The energy storage element(s) 585 included in an active energy harvesting device and/or a semi-passive energy harvesting device can be charged using harvested RF energy.

As mentioned above, passive and semi-passive energy harvesting devices transmit uplink communications by performing backscatter modulation to modulate and reflect a received downlink signal. The received downlink signal is used to provide both electrical power (e.g., to perform demodulation, local processing, and modulation) and a carrier wave for uplink communication (e.g., the reflection of the downlink signal). For example, a portion of the downlink signal will be backscattered as an uplink signal and a remaining portion of the downlinks signal can be used to perform energy harvesting.

Active energy harvesting devices can transmit uplink communications without performing backscatter modulation and without receiving a corresponding downlink signal (e.g., an active energy harvesting device includes an energy storage element to provide electrical power and includes a powered transceiver to generate a carrier wave for an uplink communication). In the absence of a downlink signal, passive and semi-passive energy harvesting devices cannot transmit an uplink signal (e.g., passive communication). Active energy harvesting devices do not depend on receiving a downlink signal in order to transmit an uplink signal and can transmit an uplink signal as desired (e.g., active communication).

In examples in which the energy harvesting device 500 is implemented as a passive or semi-passive energy harvesting device, a continuous carrier wave downlink signal may be received using antenna 590 and modulated (e.g., re-modulated) for uplink communication. In some cases, a modulator 560 can be used to modulate the reflected (e.g., backscattered) portion of the downlink signal. For example, the continuous carrier wave may be a continuous sinusoidal wave (e.g., sine or cosine waveform) and modulator 560 can perform modulation based on varying one or more of the amplitude and the phase of the backscattered reflection. Based on modulating the backscattered reflection, modulator 560 can encode digital symbols (e.g., such as binary symbols or more complex systems of symbols) indicative of an uplink communication or data message. For example, the uplink communication may be indicative of sensor data or other information associated with the one or more sensors 570 included in energy harvesting device 500.

As mentioned previously, impedance matching component 510 can be used to match the impedance of antenna 590 to the receive components of energy harvesting device 500 when receiving the downlink signal (e.g., when receiving the continuous carrier wave). In some examples, during backscatter operation (e.g., when transmitting an uplink signal), modulation can be performed based on intentionally mismatching the antenna input impedance to cause a portion of the incident downlink signal to be scattered back. The phase and amplitude of the backscattered reflection may be determined based on the impedance loading on the antenna 590. Based on varying the antenna impedance (e.g., varying the impedance mismatch between antenna 590 and the remaining components of energy harvesting device 500), digital symbols and/or binary information can be encoded (e.g., modulated) onto the backscattered reflection. Varying the antenna impedance to modulate the phase and/or amplitude of the backscattered reflection can be performed using modulator 560.

As illustrated in FIG. 5, a portion of a downlink signal received using antenna 590 can be provided to a demodulator 520, which performs demodulation and provides a downlink communication (e.g., carried or modulated on the downlink signal) to a micro-controller unit (MCU) 550 or other processor included in the energy harvesting device 500. A remaining portion of the downlink signal received using antenna 590 can be provided to energy harvester 530, which harvests RF energy from the downlink signal. For example, energy harvester 530 can harvest RF energy based on performing AC-to-DC (alternating current-to-direct current) conversion, wherein an AC current is generated from the sinusoidal carrier wave of the downlink signal and the converted DC current is used to power the energy harvesting device 500. In some aspects, energy harvester 530 can include one or more rectifiers for performing AC-to-DC conversion. A rectifier can include one or more diodes or thin-film transistors (TFTs). In one illustrative example, energy harvester 530 can include one or more Schottky diode-based rectifiers. In some cases, energy harvester 530 can include one or more TFT-based rectifiers.

The output of the energy harvester 530 is a DC current generated from (e.g., harvested from) the portion of the downlink signal provided to the energy harvester 530. In some aspects, the DC current output of energy harvester 530 may vary with the input provided to the energy harvester 530. For example, an increase in the input current to energy harvester 530 can be associated with an increase in the output DC current generated by energy harvester 530. In some cases, MCU 550 may be associated with a narrow band of acceptable DC current values. Regulator 540 can be used to remove or otherwise decrease variation(s) in the DC current generated as output by energy harvester 530. For example, regulator 540 can remove or smooth spikes (e.g., increases) in the DC current output by energy harvester 530 (e.g., such that the DC current provided as input to MCU 550 by regulator 540 remains below a first threshold). In some cases, regulator 540 can remove or otherwise compensate for drops or decreases in the DC current output by energy harvester 530 (e.g., such that the DC current provided as input to MCU 550 by regulator 540 remains above a second threshold).

In some aspects, the harvested DC current (e.g., generated by energy harvester 530 and regulated upward or downward as needed by regulator 540) can be used to power MCU 550 and one or more additional components included in the energy harvesting device 500. For example, the harvested DC current can additionally be used to power one or more (or all) of the impedance matching component 510, demodulator 520, regulator 540, MCU 550, sensors 570, modulator 560, etc. For example, sensors 570 and modulator 560 can receive at least a portion of the harvested DC current that remains after MCU 550 (e.g., that is not consumed by MCU 550). In some cases, the harvested DC current output by regulator 540 can be provided to MCU 550, modulator 560, and sensors 570 in series, in parallel, or a combination thereof.

In some examples, sensors 570 can be used to obtain sensor data (e.g., such as sensor data associated with an environment in which the energy harvesting device 500 is located). Sensors 570 can include one or more sensors, which may be of a same or different type(s). In some aspects, one or more (or all) of the sensors 570 can be configured to obtain sensor data based on control information included in a downlink signal received using antenna 590. For example, one or more of the sensors 570 can be configured based on a downlink communication obtained based on demodulating a received downlink signal using demodulator 520. In one illustrative example, sensor data can be transmitted based on using modulator 560 to modulate (e.g., vary one or more of amplitude and/or phase of) a backscatter reflection of the continuous carrier wave received at antenna 590. Based on modulating the backscattered reflection, modulator 560 can encode digital symbols (e.g., such as binary symbols or more complex systems of symbols) indicative of an uplink communication or data message. In some examples, modulator 560 can generate an uplink, backscatter modulated signal based on receiving sensor data directly from sensors 570. In some examples, modulator 560 can generate an uplink, backscatter modulated signal based on received sensor data from MCU 550 (e.g., based on MCU 550 receiving sensor data directly from sensors 570).

In some cases, ambient IoT devices (e.g., tag devices) may be implemented as active devices, semi-passive energy harvesting devices, and passive energy harvesting devices. In some scenarios, ambient IoT devices may be used to locate and/or track lost or misplaced items. For example, an ambient IoT device may be attached to an item by an owner (e.g., user). If the owner loses or misplaces the item, the owner may then find and/or track a location of the attached ambient IoT device to help find the item. For some ambient IoT devices, if the item, and attached ambient IoT device, is misplaced by the owner, the ambient IoT may broadcast an announcement message using a relatively low energy protocol, such as Bluetooth Low Energy (BLE) protocol. Other ambient IoT devices may modulate a backscattered reflection to generate an announcement message. A nearby relay device (e.g., a reader device), such as a wireless device (which may not necessarily be associated with the owner of the ambient IoT device), may receive the announcement message and may transmit the announcement message along with location information associated with the relay device to a cloud service. The owner may then access the cloud service to access the location information as a proxy for where the ambient IoT device and attached item are located.

In some cases, ambient IoT devices may be relatively low-cost devices and may have relatively limited (or no) power source. Such ambient IoT devices may thus have a limited (or no) ability to perform complex processing, such as to implement a full cellular communications protocol stack, support more than minimal cryptographic processing, maintain a session or state over time, actively transmit messages, access SIM credentials, etc.

Figure 6:
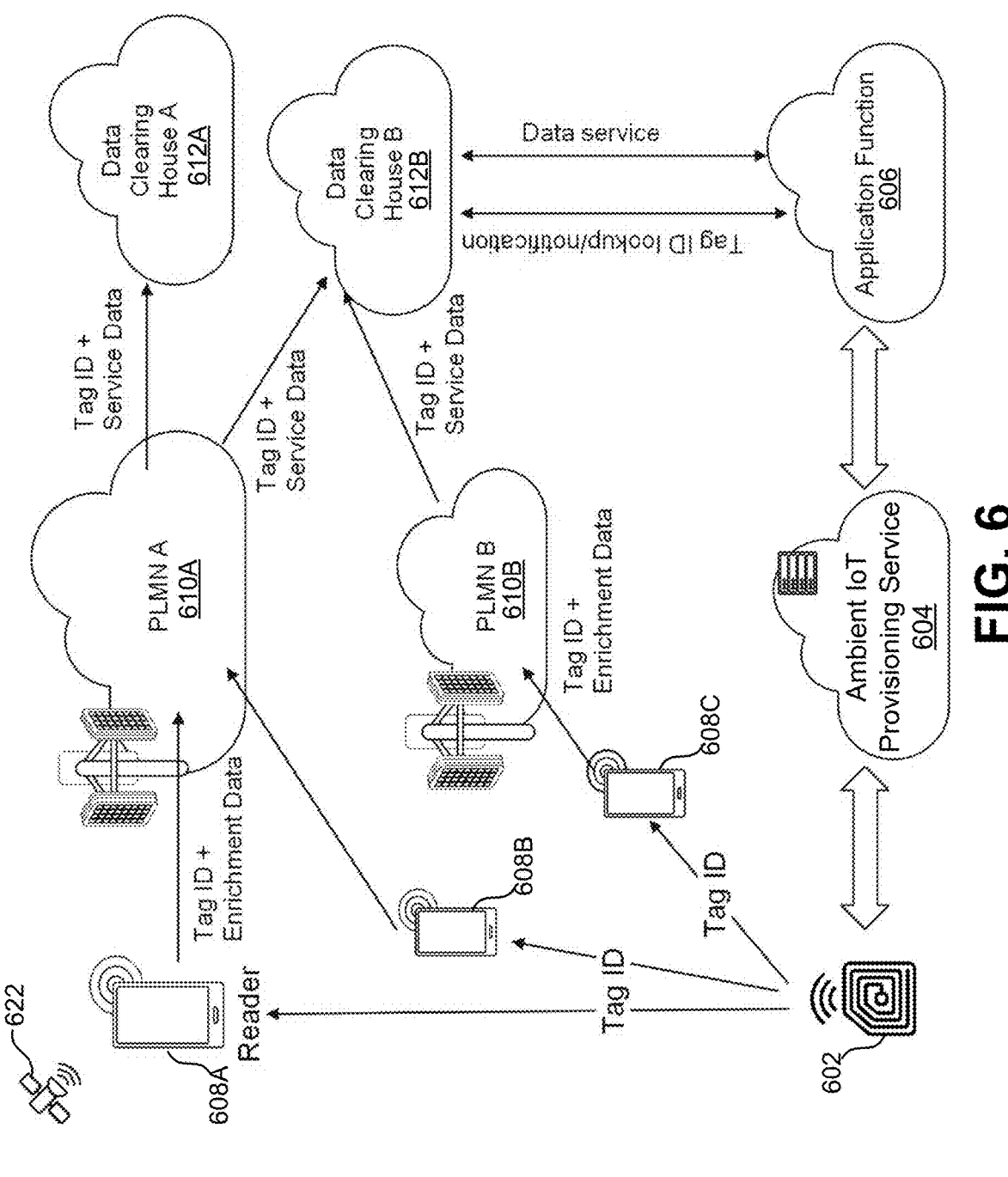
FIG. 6 is a diagram illustrating an example of an environment for using an ambient Internet of Things (IoT) device, in accordance with aspects of the present disclosure.

FIG. 6 is a diagram illustrating an example of an environment 600 for using an ambient IoT device, in accordance with aspects of the present disclosure. In FIG. 6, an ambient IoT device 602 may be provisioned by an ambient IoT service 604 to operate with an application function 606. For example, the ambient IoT service 604 may provide the ambient IoT device 602 with a tag identification information (ID) and/or a credential that is shared with the application function 606. The ambient IoT device 602 may be an active device, passive energy harvesting device, or semi-passive energy harvesting device. The tag ID may include identification information for the ambient IoT device 602 and the tag ID may be concealed. For example, the tag ID may be hashed, encrypted, scrambled, etc. In some cases, the tag ID may also include metadata. This metadata may include information to help route, identify, and/or provide additional information regarding the associated ambient IoT device. Examples of the metadata may include an increment number, an address (e.g., URL/code/service identifier) to an associated data clearing house, sensor data (e.g., for ambient IoT devices with sensors), etc. The credential may be used to allow the ambient IoT device 602 to communicate with the application function 606. The credentials may be associated with a specific application function 606 (e.g., which may execute on multiple physical devices) and the tag IDs may be public land mobile network (PLMN) agnostic. A PLMN may be a mobile operator's wireless network.

In some cases, the tag may transmit (e.g., via back scattering for passive or semi-passive devices) the tag ID and credential information, which may be received by the reader devices 608A, 608B, and 608C. For example, a signal from the ambient IoT device 602 including the tag ID and credentials may be received by a reader (e.g., relay) device 608B. A reader device, such as reader devices 608A-608C (collectively reader devices 608) may be a wireless device which receives signals from the ambient IoT devices and reports the received signals to the wireless networks. The reader devices 608 may be associated with a particular PLMN (e.g., subscribed to services on a PLMN). As shown in FIG. 6, reader device 608B is associated with PLMN A 610A and the reader device 608B may relay the signal received from the ambient IoT device 602 to the PLMN A 610A.

In some cases, the reader device 608B may transmit enrichment data along with the relayed signal from the ambient IoT device 602. Examples of this enrichment data may include GNSS location information (e.g., provided via GNSS satellite based systems 622, such as GPS, GLONASS, GNSS, BDS, and the like), neighboring cell IDs, sensor data, etc., and the enrichment data to be sent may be configured, for example, by the PLMN A 610A associated with the reader device 608B, a manufacturer or operating system of the reader device 608B, a standard the reader device 608B is compliant with, etc. In some cases, the enrichment data may be concealed, for example, by hashing, encryption, scrambling, etc. In some cases, the reader devices 608 may also transmit the back-scattering signal for use by ambient IoT devices 602.

The PLMN, such as PLMN A 610A, may provide communications services with the ambient IoT devices, such as ambient IoT device 602 as a service to one or more data clearing houses such as data clearing house A 612A and data clearing house B 612B (collectively data clearing houses 612). For example, the PLMN A 610A may receive the information transmitted by the reader device 608B (e.g., signal from the ambient IoT device 602 and enrichment data) and verify and/or process the enrichment data to produce service data. The PLMN A 610A may then forward the signal from the ambient IoT device 602 and service data to a data clearing house associated with the ambient IoT device 602, such the data clearing house B 612B. In some cases, the PLMN A 610A may determine which data clearing house, of the data clearing houses 612, to forward to based on metadata included with the tag ID (e.g., a URL/code/ service identifier of the data clearing house 612). In some cases, the PLMN A 610A may collect enrichment data from multiple reader devices 608 and process this data as service data. For example, the PLMN A 610A may collect enrichment data, such as temperature information from multiple reader devices 608 and may average this data (e.g., for reader devices 608 in a certain area) and transmit this data to data clearing house B 612B as a part of the service data.

In some cases, if, for example, an owner of the ambient IoT device 602 is attempting to obtain information from the ambient IoT device 602 (e.g., if the ambient IoT device 602 is lost/misplaced), the application function 606 may receive a request, such as from the owner, to obtain information about the ambient IoT device 602. The application function 606 may then perform a tag lookup from the data clearing house B 612B based on the credential and/or tag ID. The data clearing house B 612B may return the signal from the ambient IoT device 602 and associated service data (if any).

As discussed above, an ambient IoT device 602 may have limited processing and cryptographic capabilities and may not be capable of performing security operations that may be performed other Ues. For example, ambient IoT devices 602 may not have a subscription to any mobile network operator (e.g., PLMNs 610A, 610B, and 610C) and may not have a way to authenticate between the ambient IoT device 602 and the mobile network operator (e.g., the ambient IoT device 602 may not be able to identify itself to the mobile network operator and the ambient IoT device 602 may not be able to identify the mobile network operator). Thus, there may be a desire for a security architecture for ambient IoT devices 602.

Figure 7:
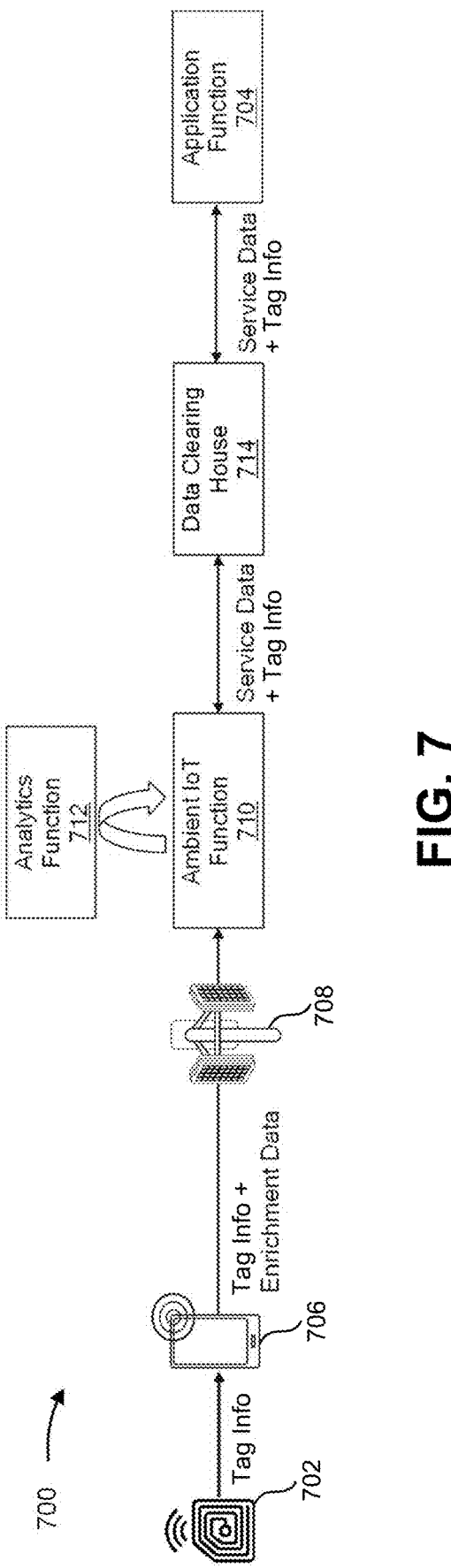
FIG. 7 is a block diagram illustrating security for ambient IoT devices, in accordance with aspects of the present disclosure.

FIG. 7 is a block diagram illustrating security for ambient IoT devices 700, in accordance with aspects of the present disclosure. In some cases, security functions for ambient IoT devices 702 may be managed by the application function 704 and end-to-end credential management and security protection may operate as between the ambient IoT device 702 and the application function 704. For example, the ambient IoT device 702 may transmit tag information including a tag ID and metadata. In some cases, the tag information may be an unstructured binary string of a limited and/or predefined size. In some cases, the tag ID and/or metadata may be protected based on credentials shared between the ambient IoT device 702 and the application function 704. In some cases, the tag ID may be protected (e.g., encrypted, encoded, derived based on the shared key with the application function, etc.). For example, the tag ID may be encoded using the shared credential, a public key of the application function 704, a public key of the ambient IoT function, a public key of the data clearing house, etc. Where the tag ID is protected, routing information may be provided along with the message (e.g., as a part of the metadata).

In some cases, the tag information may also include routing information. The routing information may indicate where on the network the message from the ambient IoT can be directed to. For example, the routing information may be a URL/URI for an application function 704 associated with the ambient IoT device 702.

The credentials for the tag ID may be based on public key or symmetric key based cryptography, or a token. The credentials help enhance privacy for the ambient IoT device 702 by allowing portions of the message transmitted by the IoT device 702 to be concealed in a manner similar to subscription concealed identifier (SUCI) using the elliptic curve integrated encryption scheme (ECIES). In cases where the credentials for the tag ID are based on public key cryptography, the Credentials may be based on a public key of an owner of the ambient IoT device 702. In some cases, the owner of the ambient IoT device 702 may be a user of the ambient IoT device 702. In other cases, the owner of the ambient IoT device 702 may be the network or a third party.

In some cases, the credentials for the tag ID may be based on symmetric key cryptography. In some cases, symmetric key cryptography may be useful when message size is a concern. In some cases, the symmetric key may be used to generate a temporary tag ID. To allow the temporary tag ID to be changed (e.g., not static), a freshness parameter may also be used along with the symmetric key to generate the temporary tag ID. In some cases, the freshness parameter may be based on a timer (e.g., time when the temporary tag ID was generated), time period (e.g., range of when the temporary tag ID was generated), counter number, random or pseudo-random number, etc. In some cases, the freshness parameter may also be used for public key based cryptography. In some cases, the symmetric key may be used to generate an ephemeral public key/private key pair and a corresponding key identifier. The key identifier may be derived from the public key or may be the public key itself and the key identifier may be used as the tag ID.

In some cases, the credentials for the tag ID may be based on a token. The token may be used as proof of service access authorization and the token may be issued by the application function of an ambient IoT service (e.g., or service access) or the mobile network operator (e.g., for network access). In such cases, the application function of the ambient IoT service or the mobile network operator can be referred to as an issuer of the token or a token issuer. The issued token may be provisioned to the ambient IoT device 702 by an ambient IoT provisioning service 604. In some cases, the token may be included as a part of the metadata to access the ambient IoT service. In some cases, a provisioning service may be a service which prepare/configures a device and/or service, such as the ambient IoT device 702 to operate with a service, such as the application function 704.

As discussed above, the credentials may be shared between the ambient IoT device 702 and the application function 704 as a part of a provisioning process such as by an ambient IoT provisioning service 604 of FIG. 6. A reader device 706 may receive the message from the ambient IoT device 702 and obtain enrichment data. For example, the reader device 706 may obtain location data or other information from sensors of the reader device 706 as enrichment data. The reader device 706 may then transmit the message from the ambient IoT device 702 along with the enrichment data to a PLMN 708 associated with the reader device 706 (e.g., the PLMN 708 the reader device 706 is subscribed to).

The reader device 706 may secure its transmission to the PLMN 708 using standard security protocols supported by the PLMN. For example, the reader device 706 may secure its transmission to an ambient IoT function 710 in a 3GPP/4G/5G PLMN using existing protocols, such as transport layer security (TLS), based on generic bootstrapping architecture (GBA), authentication and key management (AKMA), etc.

After the transmission from the reader device 706 is received by the PLMN 708, the message from the ambient IoT device 702 and enrichment data may be processed by the network (e.g., core network 170 of FIG. 1). In some cases, the enrichment data may be passed to an ambient IoT function 710. The ambient IoT function 710 may include one or more analytics functions 712, which may verify and/or process the enrichment data to generate service data. For example, the ambient IoT function 710 may gather enrichment data such as temperatures and the analysis function 712 may process the data by generating a rolling average temperature as service data. In cases where the tag ID is protected, service data may be prepared based on the protected tag ID. In cases where a temporary tag ID is used, service data may be prepared based on the temporary tag ID. The ambient IoT function 710 may send the message from the ambient IoT device 702 and service data to a data clearing house 714 and/or application function 704 secured using existing network data exchange procedures and/or protocols such as those associated with a network exposure function (NEF), application service provider (ASP), TLS security, etc. In some cases, the ambient IoT function 710, data clearing house 714, application function 704, and/or any combination thereof, may be combined into a single entity on the network.

As discussed above, end-to-end security may be provided as between the ambient IoT device 702 and the application function based on the credentials for the tag ID and the application function 704 may be able to verify tag information (e.g., tag ID and/or metadata protected by the credentials and sent by the ambient IoT device 702). In some cases, it may be useful to allow the mobile network operator (for example operating the PLMN 708, ambient IoT function 710 and possibly the data clearing house 714) to authenticate the ambient IoT device 702 may be useful.

In some cases, the mobile network operator (e.g., PLMN 708 and ambient IoT function 710) and data clearing house 714 (if separate from the mobile network operator) may be configured to indirectly verify the ambient IoT tag information. For indirect verification, when the mobile network operator receives a message from an ambient IoT device 702 (e.g., via a reader device 706), the mobile network operator may store the message (e.g., tag ID and metadata). The application function 704 may generate a list of encoded tag IDs (e.g., temp tag IDs, encrypted tag IDs, etc.) associated with the application function 704 and the application function 704 may request messages associated with the encoded tag IDs of the list of encoded tag IDs from the mobile network operator. The mobile network operator may compare the list of encoded tag IDs to the stored messages (e.g., the stored tag info) to determine matching messages then provide the messages and service data associated with the encoded tag IDs in the list of encoded tag IDs to the application function 704. The mobile operator implicitly verifies the ambient IoT device based on the matching messages and messages that are not requested (e.g., non-matching messages) are implicitly not verified by the mobile operator. Any unclaimed messages and/or service data may be discarded after exceeding a certain threshold period of time as these messages are assumed to be from unverified ambient IoT devices 702. Of note, in some cases, encoded tag IDs may be periodically changed (e.g., refreshed based on the freshness parameter) by the ambient IoT device 702 and the application function 704 may be able to generate the refreshed encoded tag IDs from the shared credentials (e.g., based on the freshness parameter).

In some cases, it may be useful to allow tag information of ambient IoT devices 702 to be directly verified by mobile network operators. For example, to avoid having to locally store ambient IoT messages while waiting for them to be claimed, it may be useful to allow the mobile network operator to directly verify ambient IoT messages.

One example technique for allowing the mobile network operator to directly verify ambient IoT messages may include the application function 704 providing a tag verification key to the mobile network operator. This tag verification key may be derived based on the shared credential between the application function 704 and the ambient IoT device 702. For example, the application function 704 and the ambient IoT device 702 may both derive a tag verification key based on the shared credential and one or more parameters (e.g., identifier for the mobile network operator, identifier for a network device, a time interval, timer, counter number, random or pseudo-random number, etc.). Incorporating the freshness parameter may allow the applicability of the tag verification key to be limited in scope (e.g., time, mobile network operator, etc.) and provide for flexibility in case, for example, the tag information is transported over a different mobile network operator. In some cases, the generated tag verification key may be used for a certain period of time. The application function 704 may provide the generated tag verification key to the mobile network operator. The ambient IoT device 702 may use the tag verification key to encode the tag ID and/or portions of the tag information. The mobile network operator may then verify a received message from the ambient IoT device 702 by using the tag verification key to decode the tag ID and/or portions of the tag information to determine if the message is valid. Invalid ambient IoT messages may be dropped, while valid ambient IoT message may be sent to the application function 704 along with corresponding service data.

In some cases, encoding the tag ID and/or portions of the tag information and maintaining a tag verification key separate from the shared credential may not be appropriate for every type of ambient IoT device. Another technique for allowing the mobile network operator to directly verify ambient IoT messages may include the application function 704 providing a list of valid encoded tag IDs to the mobile network operator (or data clearing house 714). For example, the application function 704 and the ambient IoT device 702 may generate a temporary tag ID based on the shared credential and one or more freshness parameters (e.g., identifier for the mobile network operator for a time interval, timer, counter number, random or pseudo-random number, etc.). In some cases, the generated temporary tag ID may be used for a certain period of time. The application function 704 may then provide a list of valid tag IDs for the ambient IoT devices associated with the application function 704 to the mobile network operator for a given time period. The ambient IoT device 702 may include the temporary tag ID as the tag ID for transmitted messages. The mobile network operator may compare a tag ID for a received ambient IoT message (e.g., from a reader device 706) to the list of valid tag IDs to determine whether the received ambient IoT message is valid. Invalid ambient IoT messages may be dropped, while valid ambient IoT message may be sent to the application function 704 along with corresponding service data. In some cases, the length of the tag ID may be of a sufficient length, such as 128 bits, to avoid possible collisions.

In some cases, the mobile network operator or data clearing house 714 may verify the tag ID (e.g., as opposed to the temporary tag ID). To allow the verification of the tag ID while still providing privacy to the ambient IoT device, the tag ID may be encoded using a public key of the mobile network operator or data clearing house 714 and the public key (or tag ID encrypted using the public key) may be provisioned to the ambient IoT device (e.g., via a provisioning procedure such as through a provisioning service like the ambient IoT provisioning service 604 of FIG. 6, as a part of manufacturing the ambient IoT device, etc.). In cases where the tag ID is encoded using a public key of the mobile network operator or data clearing house 714, the mobile network operator or data clearing how may be provided with the tag IDs of ambient IoT devices, for example, by the application function 704, and the encoded tag ID decoded using a private key of the mobile network operator or data clearing house 714. Service data may then be prepared based on the encrypted tag ID or the decrypted tag ID.

Figure 8:
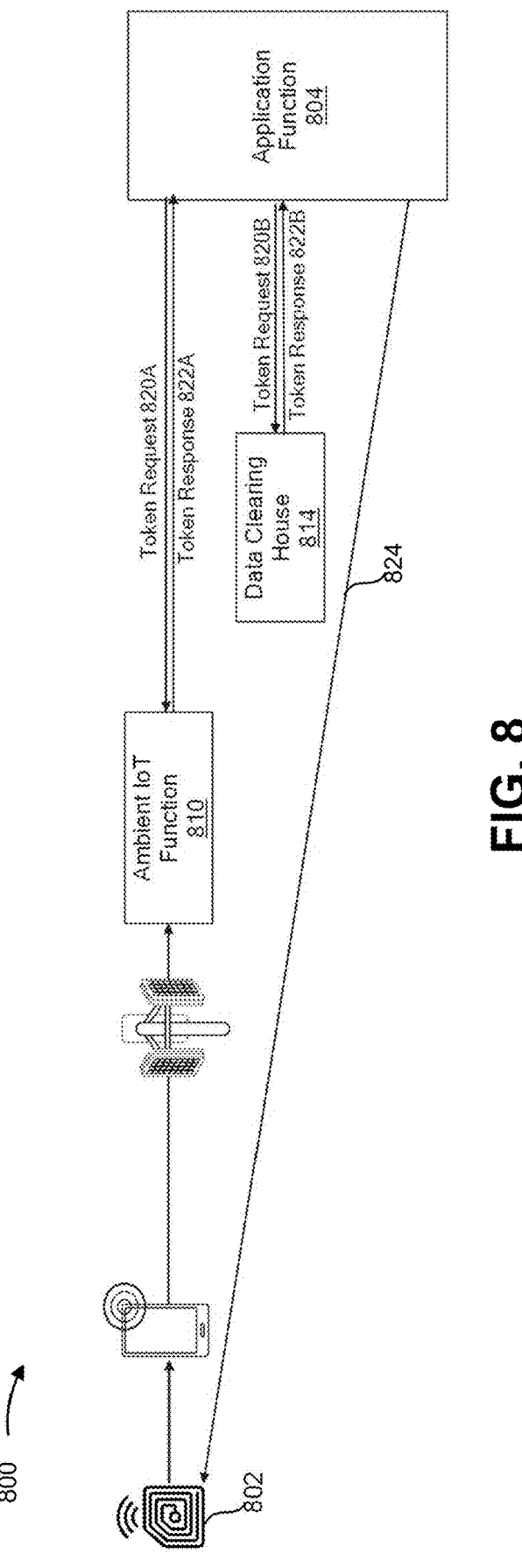
FIG. 8 is a block diagram illustrating a token request, in accordance with aspects of the present disclosure.

Another technique for allowing the mobile network operator to directly verify ambient IoT messages may include the mobile network operator (or data clearing house 714) issuing a token to the application function 704 for the ambient IoT device 702. FIG. 8 is a block diagram illustrating a token request 800, in accordance with aspects of the present disclosure. In some cases, the token may be issued by an entity (e.g., a token issuer) which may verify the tag ID without knowledge of the tag ID. As shown in FIG. 8, the entity issuing the token may be the ambient IoT function 810 (e.g., for the mobile network operator) or the data clearing house 814 (e.g., in cases where the data clearing house 814 is separate from the mobile network operator). In some cases, the token may be issued via a separate logical function of the ambient IoT function 810 or the data clearing house 814. Token request, issuance, and verification may be performed in substantially the say way as between the ambient IoT function 810 and the data clearing house.

In some cases, the token may include a serial number and a message authentication code (MAC). The serial number may be a number assigned to the token by the issuing entity (e.g., ambient IoT function 810 or the data clearing house 814). The MAC may be created using a secret key of the issuing entity. In some cases, a signature may also be included in the token.

As shown, the application function 804 may request 820A the token from the ambient IoT function 810 (or request 820B the token from the data clearing house 814) and in response 822A, the ambient IoT function 810 (or in response 822B, the data clearing house 814) may provide the token to the application function 804. In some cases, the application function 804 may bulk request tokens. In some cases, the tokens may be tag ID specific. The application function 804 may then provision 824 the ambient IoT device 802 with the token (e.g., via a provisioning procedure such as through a provisioning service like the ambient IoT provisioning service 604 of FIG. 6). Alternately, a symmetric key may be provisioned to the ambient IoT device 802 where the symmetric key (and a freshness parameter) may be used to generate a token. This generated token may be used as a one time token.

When using the token for a message, the ambient IoT device 802 may include the encrypted token with the tag information (e.g., as a part of the metadata of the message, attached along with the message, etc.) and encrypt the tag information using a public key of the issuing entity. The token may be encrypted to avoid replay attacks. The encrypted message may be transmitted to the mobile network operator. After reception by the mobile network operator, the message may be decrypted by the issuing entity. The issuing entity may then decrypt the tag information using its private key and verify the token including with the tag information was issued by the issuing entity. If the token was issued by the issuing entity, then the associated ambient IoT message is valid. Of note, the decrypted tag information may not be meaningful to the token issuing entity. Invalid ambient IoT messages may be dropped, while valid ambient IoT message may be sent to the application function 704 along with corresponding service data.

FIG. 9 is a flow diagram illustrating an example of a process 900 for wireless communications. The process 900 may be performed by a first wireless device (e.g., computing device) or by a component or system (e.g., a chipset) of the first wireless device. The first wireless device may be an energy harvesting device 500 of FIG. 5, a wireless device, such as computing system 1200, or a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network node. In some examples, the process 900 may be performed by a UE and/or an energy harvesting device. In some cases, the UE can be an energy harvesting device. The operations of the process 900 may be implemented as software components that are executed and run on one or more processors (e.g., processor 1210 of FIG. 11 or other processor(s)). Further, the transmission and reception of signals by the network device in the process 900 may be enabled, for example, by one or more antennas, one or more transceivers (e.g., wireless transceiver(s)), and/or other communication components (e.g., the transmit processor 220, the receive processor 238, the TX MIMO processor 230, the MIMO detector 236, the modulator(s)/demodulator(s) 232*a* through 232*t*, and/or the antenna(es) 234*a* through 234*t* of FIG. 2, the communications interface 1240 of FIG. 12, or other antennae(s), transceiver(s), and/or component(s)).

At block 902 the computing device (or component thereof) may receive, from a provisioning service (e.g., ambient IoT provisioning service 604 of FIG. 6), a shared credential, wherein the shared credential is shared between the device (ambient IoT device 602 of FIG. 6, ambient IoT devices 702 of FIG. 7) and an application function (e.g., application function 606 of FIG. 6, application function 704 of FIG. 7), wherein the shared credential comprises a token, wherein the token is included in the tag information, and wherein the tag information is encoded based on a public key of an issuer of the token. In some cases, the shared credential may further comprise a public key of the application function. In some cases, the issuer of the token comprises at least one of a service of a wireless network or a data clearing house coupled to the wireless network. In some examples, the token is received from the application function.

At block 904 the computing device (or component thereof) may generate tag information. In some cases, the tag information includes a tag identifier (ID) and metadata.

At block 906 the computing device (or component thereof) may encode a portion of the tag information based on the shared credential to generate encoded tag information. In some examples, the tag ID is encoded based on the shared credential, and wherein the tag information further includes routing information. In some cases, the tag ID is further encoded based on a freshness parameter comprising at least one a period of time, counter number, timer, or pseudo-random number. In some examples, the tag ID is encoded based on a tag verification key, and wherein the tag verification key is generated based on the shared credential and one or more configured parameters by the application function. In some cases, the tag ID is encoded based on a public key of a service of a wireless network or a public key of a data clearing house. In some cases, the configured parameter is the identity of a network, frequency band, the identity of a network device, or any combination thereof.

At block 908 the computing device (or component thereof) may broadcast the encoded tag information.

FIG. 10 is a flow diagram illustrating an example of a process 1000 for wireless communications. The process 1000 may be performed by a device (e.g., computing device) or by a component or system (e.g., a chipset) of the device configured as the application function (e.g., application function 606 of FIG. 6, application function 704 of FIG. 7, application function 804 of FIG. 8). The device may be coupled to or a part of a core network (e.g., core network 170 of FIG. 1), and the device may be server device, such as computing system 1200 configured to provide and/or receive data from a UE (e.g., UE 104 of FIG. 1, wireless device 407 of FIG. 4, a mobile device such as a mobile phone, a network-connected wearable such as a watch, an extended reality device such as a virtual reality (VR) device or augmented reality (AR) device, a vehicle or component or system of a vehicle, or other type of UE) or other type of network node. The operations of the process 1000 may be implemented as software components that are executed and run on one or more processors (e.g., processor 1210 of FIG. 12 or other processor(s)).

At block 1002, the computing device (or component thereof) may provision a wireless device with a shared credential, wherein the shared credential is shared between the device (e.g., application function 606 of FIG. 6, application function 704 of FIG. 7) and the wireless device (ambient IoT device 602 of FIG. 6, ambient IoT devices 702 of FIG. 7), wherein the shared credential comprises a token, wherein the token is included in the tag information, and wherein the tag information is encoded based on a public key of an issuer of the token. In some cases, the device (e.g., application function) may provision the wireless device with the shared credential via a provisioning service (e.g., ambient IoT provisioning service 604 of FIG. 6). For example, the device may provide a set of shared credentials to the provisioning service, and the provisioning service may provide information about ambient IoT devices provisioned using the shared credentials. In some examples, the shared credential may further comprise a public key of the application function.

At block 1004, the computing device (or component thereof) may provide information associated with the wireless device to a service of a wireless network. In some cases, the information associated with the wireless device provided to the service comprises at least one of: a list of encoded tag IDs; a tag verification key; and a request for a token for a wireless device. In some examples, the information associated with the wireless device provided to the service comprises the list of encoded tag IDs which are valid for a period of time. In some cases, the information associated with the wireless device provided to the service comprises a tag verification key, and the computing device (or component thereof) may generate the tag verification key based on the shared credential and one or more configured parameters by the application function; and decode the encoded tag ID of the tag information based on the tag verification key. In some examples, the information associated with the wireless device provided to the service comprises a request for a token, wherein the token is issued by a token issuer, and the computing device (or component thereof) may receive the token in response to the request for the token; and provide the token and a public key of the token issuer to the wireless device. In some cases, the token issuer comprises at least one of a service of a wireless network or a data clearing house coupled to the wireless network. In some cases, the configured parameter is the identity of a network, frequency band, the identity of a network device, or any combination thereof.

At block 1006, the computing device (or component thereof) may receive encoded tag information from the wireless device. In some cases, the tag information includes an encoded tag identifier (ID) and metadata. In some examples, the encoded tag ID and token is encrypted based on the public key of the token issuer.

Figure 11:
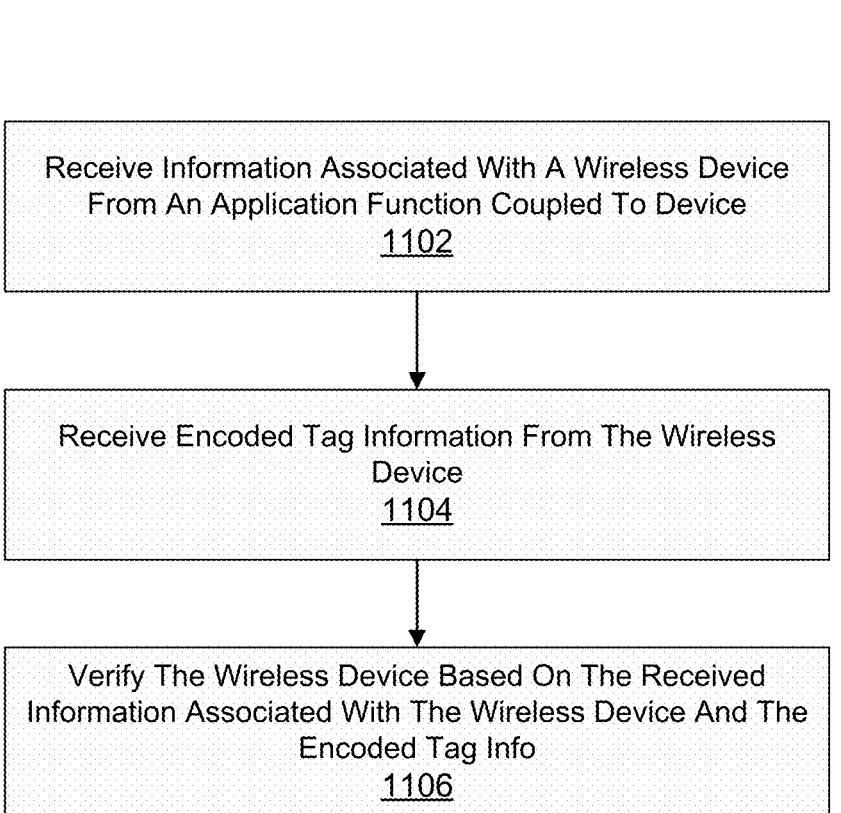
FIG. 11 is a flow diagram illustrating another example of a process for wireless communications, in accordance with some examples.

At block 1008, the computing device (or component thereof) may decode at least a portion of the encoded tag information based on the shared credential to obtain tag information from the wireless device FIG. 11 is a flow diagram illustrating an example of a process 1100 for wireless communications. The process 1100 may be performed by a device (e.g., computing device) or by a component or system (e.g., a chipset) of the device configured as the ambient IoT function (e.g., ambient IoT function 710 of FIG. 7, ambient IoT function 810 of FIG. 8). The device may be coupled to or a part of a core network (e.g., core network 170 of FIG. 1), and the device may be server device, such as computing system 1200 configured to provide and/or receive data from a UE (e.g., UE 104 of FIG. 1, wireless device 407 of FIG. 4, a mobile device such as a mobile phone, a network-connected wearable such as a watch, an extended reality device such as a virtual reality (VR) device or augmented reality (AR) device, a vehicle or component or system of a vehicle, or other type of UE) or other type of network node. The operations of the process 1100 may be implemented as software components that are executed and run on one or more processors (e.g., processor 1210 of FIG. 12 or other processor(s)).

At block 1102, the computing device (or component thereof) may receive information associated with a wireless device (ambient IoT device 602 of FIG. 6, ambient IoT devices 702 of FIG. 7) from an application function (e.g., application function 606 of FIG. 6, application function 704 of FIG. 7, application function 804 of FIG. 8) coupled to the device (e.g., ambient IoT function 710 of FIG. 7, ambient IoT function 810 of FIG. 8). In some cases, the information associated with the wireless device provided to the service comprises at least one of: a list of encoded tag IDs; a tag verification key; and a request for a token for a wireless device. In some examples, the information associated with the wireless device received from the application function comprises a list of encoded tag IDs, and wherein computing device (or component thereof) may store the received tag information; receive, from the application function, a request for the received tag information, the request including an encoded tag ID; determine that the encoded tag ID corresponds to a portion of the stored tag information, wherein verification of the wireless device is based on the determination that the encoded tag ID corresponds to a portion of the stored tag information; and provide the received tag information to the application function. In some cases, the information associated with the wireless device received from the application function comprises a list of encoded tag IDs, and wherein the computing device (or component thereof) may store the received tag information; determine that the received tag information has been stored for a time period exceeding a threshold period of time without being requested by the application function; and discard the received encoded tag information. In some examples, the information associated with the wireless device received from the application function comprises a tag verification key, and wherein the computing device (or component thereof) may decode the encoded tag ID of the tag information based on the tag verification key; and provide the tag information to the application function based on the decoded tag ID. In some cases, the information associated with the wireless device received from the application function comprises a request for a token, and wherein the computing device (or component thereof) may issue a token to the application function in response to the request for the token. In some cases, the encoded tag ID and the token are encrypted based on a public key associated with the device At block 1104, the computing device (or component thereof) may receive encoded tag information from the wireless device. In some cases, the tag information includes an encoded tag identifier (ID) and metadata.

At block 1106, the computing device (or component thereof) may verify the wireless device based on the received information associated with the wireless device and the encoded tag information. In some cases, the computing device (or component thereof) may decode the encoded tag information from the wireless device using a private key associated with the device to obtain the token; determine that the obtained token matches the issued token; and provide the tag information to the application function based on the determination that the obtained token matches the issued token.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The processes 900, 1000, and 1100 are illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, processes 900, 1000, and 1100, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
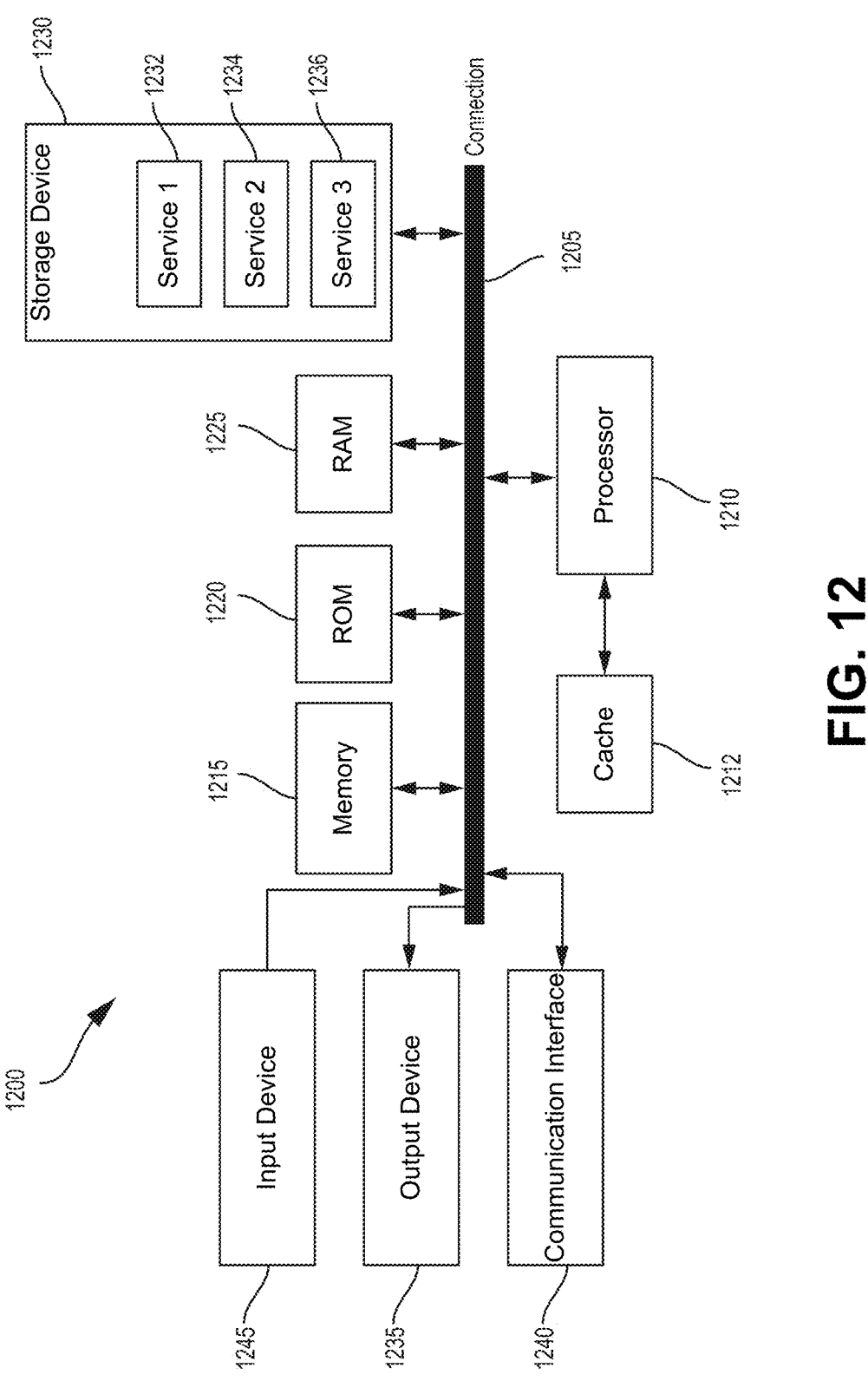
FIG. 12 is a block diagram illustrating an example of a computing system, in accordance with some examples.

FIG. 12 is a diagram illustrating an example of a system for implementing certain aspects of the present technology. In particular, FIG. 12 illustrates an example of computing system 1200, which may be for example any computing device making up internal computing system, a remote computing system, a camera, or any component thereof in which the components of the system are in communication with each other using connection 1205. Connection 1205 may be a physical connection using a bus, or a direct connection into processor 1210, such as in a chipset architecture. Connection 1205 may also be a virtual connection, networked connection, or logical connection.

In some aspects, computing system 1200 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1200 includes at least one processing unit (CPU or processor) 1210 and connection 1205 that communicatively couples various system components including system memory 1225, such as read-only memory (ROM) 1220 and random access memory (RAM) 1225 to processor 1210. Computing system 1200 may include a cache 1215 of high-speed memory connected directly with, in close proximity to, or integrated as part of processor 1210.

Processor 1210 may include any general-purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which may represent any number of input mechanisms, such as a microphone for speech, a touch-sensitive screen for gesture or graphical input, keyboard, mouse, motion input, speech, etc. Computing system 1200 may also include output device 1235, which may be one or more of a number of output mechanisms. In some instances, multimodal systems may enable a user to provide multiple types of input/output to communicate with computing system 1200.

Computing system 1200 may include communications interface 1240, which may generally govern and manage the user input and system output. The communications interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EE-PROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1230 may include software services, servers, services, etc., that when the code that defines such software is executed by the processor 1210, it causes the system to perform a function. In some aspects, a hardware service that performs a particular function may include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A device for wireless communication, comprising: a memory system comprising instructions; and a processor system coupled to the memory system, the processor system configured to: receive, from a provisioning service, a shared credential, wherein the shared credential is shared between the device and an application function, wherein the shared credential comprises a token, wherein the token is included in the tag information, and wherein the tag information is encoded based on a public key of an issuer of the token; generate tag information; encode a portion of the tag information based on the shared credential to generate encoded tag information; and broadcast the encoded tag information.

Aspect 2. The device of Aspect 1, wherein the tag information includes a tag identifier (ID) and metadata.

Aspect 3. The device of Aspect 2, wherein the tag ID is encoded based on the shared credential, and wherein the tag information further includes routing information.

Aspect 4. The device of Aspect 3, wherein the tag ID is further encoded based on a freshness parameter comprising at least one a period of time, counter number, timer, or pseudo-random number.

Aspect 5. The device of any of Aspects 2-4, wherein the tag ID is encoded based on a tag verification key, and wherein the tag verification key is generated based on the shared credential and one or more configured parameters by the application function.

Aspect 6. The device of any of Aspects 2-5, wherein the tag ID is encoded based on a public key of a service of a wireless network or a public key of a data clearing house.

Aspect 7. The device of any of Aspects 1-6 wherein the shared credential comprises a public key of the application function.

Aspect 8. The device of Aspect 5, wherein the configured parameter is the identity of a network, frequency band, the identity of a network device, or any combination thereof.

Aspect 9. The device of Aspect 1, wherein the issuer of the token comprises at least one of a service of a wireless network or a data clearing house coupled to the wireless network.

Aspect 10. The device of any of Aspects 1-9, wherein the token is received from the application function.

Aspect 11. A device for wireless communication by an application function, comprising: a memory system comprising instructions; and a processor system coupled to the memory system, the processor system configured to: provision a wireless device with a shared credential, wherein the shared credential is shared between the device and the wireless device, wherein the shared credential comprises a token, wherein the token is included in the tag information, and wherein the tag information is encoded based on a public key of an issuer of the token; provide information associated with the wireless device to a service of a wireless network; receive encoded tag information from the wireless device; and decode at least a portion of the encoded tag information based on the shared credential to obtain tag information from the wireless device.

Aspect 12. The device of Aspect 11, wherein the tag information includes an encoded tag identifier (ID) and metadata.

Aspect 13. The device of Aspect 12, wherein the information associated with the wireless device provided to the service comprises at least one of: a list of encoded tag IDs; a tag verification key; and a request for a token for a wireless device.

Aspect 14. The device of Aspect 13, wherein the information associated with the wireless device provided to the service comprises the list of encoded tag IDs which are valid for a period of time.

Aspect 15. The device of any of Aspects 13-14, wherein the information associated with the wireless device provided to the service comprises a tag verification key, and wherein the processor system is further configured to: generate the tag verification key based on the shared credential and one or more configured parameters by the application function; and decode the encoded tag ID of the tag information based on the tag verification key.

Aspect 16. The device of any of Aspects 13-15, wherein the information associated with the wireless device provided to the service comprises a request for a token, wherein the token is issued by a token issuer, and wherein the processor system is further configured to: receive the token in response to the request for the token; and provide the token and a public key of the token issuer to the wireless device.

Aspect 17. The device of Aspect 16, wherein the token issuer comprises at least one of a service of a wireless network or a data clearing house coupled to the wireless network.

Aspect 18. The device of any of Aspects 16-17, wherein the encoded tag ID and token is encrypted based on the public key of the token issuer.

Aspect 19. The device of any of Aspects 13-18, wherein the shared credential comprises a public key of the application function.

Aspect 20. A device for wireless communications by a service of a wireless network, comprising: a memory system comprising instructions; and a processor system coupled to the memory system, the processor system configured to: receive information associated with a wireless device from an application function coupled to the device; receive encoded tag information from the wireless device; and verify the wireless device based on the received information associated with the wireless device and the encoded tag information.

Aspect 21. The device of Aspect 20, wherein the tag information includes an encoded tag identifier (ID) and metadata.

Aspect 22. The device of Aspect 21, wherein the information associated with the wireless device provided to the service comprises at least one of: a list of encoded tag IDs; a tag verification key; and a request for a token for a wireless device.

Aspect 23. The device of any of Aspects 21-22, wherein the information associated with the wireless device received from the application function comprises a list of encoded tag IDs, and wherein the processor system is further configured to: store the received tag information; receive, from the application function, a request for the received tag information, the request including an encoded tag ID; determine that the encoded tag ID corresponds to a portion of the stored tag information, wherein verification of the wireless device is based on the determination that the encoded tag ID corresponds to a portion of the stored tag information; and provide the received tag information to the application function.

Aspect 24. The device of any of Aspects 21-23, wherein the information associated with the wireless device received from the application function comprises a list of encoded tag IDs, and wherein the processor system is further configured to: store the received tag information; determine that the received tag information has been stored for a time period exceeding a threshold period of time without being requested by the application function; and discard the received encoded tag information.

Aspect 25. The device of any of Aspects 21-24, wherein the information associated with the wireless device received from the application function comprises a tag verification key, and wherein the processor system is further configured to: decode the encoded tag ID of the tag information based on the tag verification key; and provide the tag information to the application function based on the decoded tag ID.

Aspect 26. The device of any of Aspects 21-25, wherein the information associated with the wireless device received from the application function comprises a request for a token, and wherein the processor system is further configured to issue a token to the application function in response to the request for the token.

Aspect 27. The device of Aspect 26, wherein the encoded tag ID and the token are encrypted based on a public key associated with the device.

Aspect 28. The device of Aspect 27, wherein the processor system is further configured to: decode the encoded tag information from the wireless device using a private key associated with the device to obtain the token; determine that the obtained token matches the issued token; and provide the tag information to the application function based on the determination that the obtained token matches the issued token.

Aspect 29. A method for wireless communications, comprising: receiving, from a provisioning service, a shared credential, wherein the shared credential is shared between a device and an application function, wherein the shared credential comprises a token, wherein the token is included in the tag information, and wherein the tag information is encoded based on a public key of an issuer of the token; generating tag information; encoding a portion of the tag information based on the shared credential to generate encoded tag information; and broadcasting the encoded tag information.

Aspect 30. The method of Aspect 29, wherein the tag information includes a tag identifier (ID) and metadata.

Aspect 31. The method of any of Aspects 30-31, wherein the tag ID is encoded based on the shared credential, and wherein the tag information further includes routing information.

Aspect 32. The method of Aspect 31, wherein the tag ID is further encoded based on a freshness parameter comprising at least one a period of time, counter number, timer, or pseudo-random number.

Aspect 33. The method of any of Aspects 30-32, wherein the tag ID is encoded based on a tag verification key, and wherein the tag verification key is generated based on the shared credential and one or more configured parameters by the application function.

Aspect 34. The method of any of Aspects 30-33, wherein the tag ID is encoded based on a public key of a service of a wireless network or a public key of a data clearing house.

Aspect 35. The method of any of Aspects 29-34, wherein the shared credential comprises a public key of the application function.

Aspect 36. The method of any of Aspects 29-35, wherein the configured parameter is the identity of a network, frequency band, the identity of a network device, or any combination thereof.

Aspect 37. The method of Aspect 29, wherein the issuer of the token comprises at least one of a service of a wireless network or a data clearing house coupled to the wireless network.

Aspect 38. The method of any of Aspects 29-37, wherein the token is received from the application function.

Aspect 39. A method for wireless communication by an application function, comprising: provisioning a wireless device with a shared credential, wherein the shared credential is shared between the device and the wireless device, wherein the shared credential comprises a token, wherein the token is included in the tag information, and wherein the tag information is encoded based on a public key of an issuer of the token; providing information associated with the wireless device to a service of a wireless network; receiving encoded tag information from the wireless device; and decoding at least a portion of the encoded tag information based on the shared credential to obtain tag information from the wireless device.

Aspect 40. The method of Aspect 39, wherein the tag information includes an encoded tag identifier (ID) and metadata.

Aspect 41. The method of Aspect 40, wherein the information associated with the wireless device provided to the service comprises at least one of: a list of encoded tag IDs; a tag verification key; and a request for a token for a wireless device.

Aspect 42. The method of Aspect 41, wherein the information associated with the wireless device provided to the service comprises the list of encoded tag IDs which are valid for a period of time.

Aspect 43. The method of any of Aspects 41-42, wherein the information associated with the wireless device provided to the service comprises a tag verification key, and wherein the method further comprises: generating the tag verification key based on the shared credential and one or more configured parameters by the application function; and decoding the encoded tag ID of the tag information based on the tag verification key.

Aspect 44. The method of any of Aspects 41-43, wherein the information associated with the wireless device provided to the service comprises a request for a token, wherein the token is issued by a token issuer, and wherein the method further comprises: receiving the token in response to the request for the token; and providing the token and a public key of the token issuer to the wireless device.

Aspect 45. The method of Aspect 44, wherein the token issuer comprises at least one of a service of a wireless network or a data clearing house coupled to the wireless network.

Aspect 46. The method of any of Aspects 44-45, wherein the encoded tag ID and token is encrypted based on the public key of the token issuer.

Aspect 47. The method of any of Aspects 41-46, wherein the shared credential comprises a public key of the application function.

Aspect 48. A method for wireless communications by a service of a wireless network, comprising: receiving information associated with a wireless device from an application function; receiving encoded tag information from the wireless device; and verifying the wireless device based on the received information associated with the wireless device and the encoded tag information.

Aspect 49. The method of Aspect 48, wherein the tag information includes an encoded tag identifier (ID) and metadata.

Aspect 50. The method of Aspect 49, wherein the information associated with the wireless device provided to the service comprises at least one of: a list of encoded tag IDs; a tag verification key; and a request for a token for a wireless device.

Aspect 51. The method of any of Aspects 49-50, wherein the information associated with the wireless device received from the application function comprises a list of encoded tag IDs, and wherein the method further comprises: storing the received tag information; receiving, from the application function, a request for the received tag information, the request including an encoded tag ID; determining that the encoded tag ID corresponds to a portion of the stored tag information, wherein verification of the wireless device is based on the determination that the encoded tag ID corresponds to a portion of the stored tag information; and providing the received tag information to the application function.

Aspect 52. The method of any of Aspects 49-51, wherein the information associated with the wireless device received from the application function comprises a list of encoded tag IDs, and wherein the method further comprises: storing the received tag information; determining that the received tag information has been stored for a time period exceeding a threshold period of time without being requested by the application function; and discarding the received encoded tag information.

Aspect 53. The method of any of Aspects 49-52, wherein the information associated with the wireless device received from the application function comprises a tag verification key, and wherein the method further comprises: decoding the encoded tag ID of the tag information based on the tag verification key; and providing the tag information to the application function based on the decoded tag ID.

Aspect 54. The method of any of Aspects 49-53, wherein the information associated with the wireless device received from the application function comprises a request for a token, and wherein the method further comprises issuing a token to the application function in response to the request for the token.

Aspect 55. The method of Aspect 54, wherein the encoded tag ID and the token are encrypted based on a public key associated with the device.

Aspect 56. The method of Aspect 55, further comprising: decoding the encoded tag information from the wireless device using a private key associated with the device to obtain the token; determining that the obtained token matches the issued token; and providing the tag information to the application function based on the determination that the obtained token matches the issued token.

Aspect 57. A non-transitory computer-readable medium having stored thereon instructions that, when executed by a processor system, cause the processor system to: receive, from a provisioning service, a shared credential, wherein the shared credential is shared between a device and an application function, wherein the shared credential comprises a token, wherein the token is included in the tag information, and wherein the tag information is encoded based on a public key of an issuer of the token; generate tag information; encode a portion of the tag information based on the shared credential to generate encoded tag information; and broadcast the encoded tag information.

Aspect 58. The non-transitory computer-readable medium of Aspect 57, wherein the tag information includes a tag identifier (ID) and metadata.

Aspect 59. The non-transitory computer-readable medium of Aspect 58, wherein the tag ID is encoded based on the shared credential, and wherein the tag information further includes routing information.

Aspect 60. The non-transitory computer-readable medium of Aspect 59, wherein the tag ID is further encoded based on a freshness parameter comprising at least one a period of time, counter number, timer, or pseudo-random number.

Aspect 61. The non-transitory computer-readable medium of any of Aspects 58-60, wherein the tag ID is encoded based on a tag verification key, and wherein the tag verification key is generated based on the shared credential and one or more configured parameters by the application function.

Aspect 62. The non-transitory computer-readable medium of any of Aspects 58-61, wherein the tag ID is encoded based on a public key of a service of a wireless network or a public key of a data clearing house.

Aspect 63. The non-transitory computer-readable medium of any of Aspects 57-62, wherein the shared credential comprises a public key of the application function.

Aspect 64. The non-transitory computer-readable medium of any of Aspects 61, wherein the configured parameter is the identity of a network, frequency band, the identity of a network device, or any combination thereof.

Aspect 65. The non-transitory computer-readable medium of Aspect 64, wherein the issuer of the token comprises at least one of a service of a wireless network or a data clearing house coupled to the wireless network.

Aspect 66. The non-transitory computer-readable medium of any of Aspects 64-65, wherein the token is received from the application function.

Aspect 67. A non-transitory computer-readable medium having stored thereon instructions that, when executed by a processor system, causes the processor system to: provision a wireless device with a shared credential, wherein the shared credential is shared between the device and the wireless device, wherein the shared credential comprises a token, wherein the token is included in the tag information, and wherein the tag information is encoded based on a public key of an issuer of the token; provide information associated with the wireless device to a service of a wireless network; receive encoded tag information from the wireless device; and decode at least a portion of the encoded tag information based on the shared credential to obtain tag information from the wireless device.

Aspect 68. The non-transitory computer-readable medium of Aspect 67, wherein the tag information includes an encoded tag identifier (ID) and metadata.

Aspect 69. The non-transitory computer-readable medium of Aspect 68, wherein the information associated with the wireless device provided to the service comprises at least one of: a list of encoded tag IDs; a tag verification key; and a request for a token for a wireless device.

Aspect 70. The non-transitory computer-readable medium of Aspect 69, wherein the information associated with the wireless device provided to the service comprises the list of encoded tag IDs which are valid for a period of time.

Aspect 71. The non-transitory computer-readable medium of any of Aspects 69-70, wherein the information associated with the wireless device provided to the service comprises a tag verification key, and wherein the instructions cause the processor system to: generate the tag verification key based on the shared credential and one or more configured parameters by the application function; and decode the encoded tag ID of the tag information based on the tag verification key.

Aspect 72. The non-transitory computer-readable medium of any of Aspects 69-71, wherein the information associated with the wireless device provided to the service comprises a request for a token, wherein the token is issued by a token issuer, and wherein the instructions cause the processor system to: receive the token in response to the request for the token; and provide the token and a public key of the token issuer to the wireless device.

Aspect 73. The non-transitory computer-readable medium of Aspect 72, wherein the token issuer comprises at least one of a service of a wireless network or a data clearing house coupled to the wireless network.

Aspect 74. The non-transitory computer-readable medium of any of Aspects 72-73, wherein the encoded tag ID and token is encrypted based on the public key of the token issuer.

Aspect 75. The non-transitory computer-readable medium of any of Aspects 69-74, wherein the shared credential comprises a public key of an application function.

Aspect 76. A non-transitory computer-readable medium having stored thereon instructions that, when executed by a processor system, causes the processor system to: receive information associated with a wireless device from an application function coupled to the device; receive encoded tag information from the wireless device; and verify the wireless device based on the received information associated with the wireless device and the encoded tag information.

Aspect 77. The non-transitory computer-readable medium of Aspect 76, wherein the tag information includes an encoded tag identifier (ID) and metadata.

Aspect 78. The non-transitory computer-readable medium of Aspect 77, wherein the information associated with the wireless device provided to a service comprises at least one of: a list of encoded tag IDs; a tag verification key; and a request for a token for a wireless device.

Aspect 79. The non-transitory computer-readable medium of any of Aspects 77-78, wherein the information associated with the wireless device received from the application function comprises a list of encoded tag IDs, and wherein the instructions further cause the processor system to: store the received tag information; receive, from the application function, a request for the received tag information, the request including an encoded tag ID; determine that the encoded tag ID corresponds to a portion of the stored tag information, wherein verification of the wireless device is based on the determination that the encoded tag ID corresponds to a portion of the stored tag information; and provide the received tag information to the application function.

Aspect 80. The non-transitory computer-readable medium of any of Aspects 77-79, wherein the information associated with the wireless device received from the application function comprises a list of encoded tag IDs, and wherein the instructions further cause the processor system to: store the received tag information; determine that the received tag information has been stored for a time period exceeding a threshold period of time without being requested by the application function; and discard the received encoded tag information.

Aspect 81. The non-transitory computer-readable medium of any of Aspects 77-80, wherein the information associated with the wireless device received from the application function comprises a tag verification key, and wherein the instructions further cause the processor system to: decode the encoded tag ID of the tag information based on the tag verification key; and provide the tag information to the application function based on the decoded tag ID.

Aspect 82. The non-transitory computer-readable medium of any of Aspects 77-81, wherein the information associated with the wireless device received from the application function comprises a request for a token, and wherein the instructions further cause the processor system to issue a token to the application function in response to the request for the token.

Aspect 83. The non-transitory computer-readable medium of Aspect 82, wherein the encoded tag ID and the token are encrypted based on a public key associated with the device.

Aspect 84. The non-transitory computer-readable medium of Aspect 83, wherein the instructions further cause the processor system to: decode the encoded tag information from the wireless device using a private key associated with the device to obtain the token; determine that the obtained token matches the issued token; and provide the tag information to the application function based on the determination that the obtained token matches the issued token.

Aspect 85. An apparatus for wireless communications, comprising one or more means for performing operations according to any of Aspects 29 to 56 and 87.

Aspect 86. The device of any of Aspects 13-15, wherein the configured parameter is the identity of a network, frequency band, the identity of a network device, or any combination thereof.

Aspect 87. The method of any of Aspects 41-43, wherein the configured parameter is the identity of a network, frequency band, the identity of a network device, or any combination thereof.

Aspect 88. The non-transitory computer-readable medium of any of Aspects 69-71, wherein the configured parameter is the identity of a network, frequency band, the identity of a network device, or any combination thereof.

What is claimed is:

1. A device for wireless communication, comprising:
a memory system comprising instructions; and
a processor system coupled to the memory system, the processor system configured to:
receive, from a provisioning service, a shared credential, wherein the shared credential is shared between the device and an application function of a wireless network, wherein the provisioning service is separate from the application function;
generate tag information, wherein the shared credential comprises a token, wherein the token is included in the tag information, and wherein the tag information is encoded based on a public key of an issuer of the token;
encode a portion of the tag information based on the shared credential to generate encoded tag information; and
broadcast the encoded tag information.

2. The device of claim 1, wherein the tag information includes a tag identifier (ID) and metadata.

3. The device of claim 2, wherein the tag ID is encoded based on the shared credential, and wherein the tag information further includes routing information.

4. The device of claim 3, wherein the tag ID is further encoded based on a freshness parameter comprising at least one a period of time, counter number, timer, or pseudo-random number.

5. The device of claim 2, wherein the tag ID is encoded based on a tag verification key, and wherein the tag verification key is generated based on the shared credential and one or more configured parameters by the application function.

6. The device of claim 5, wherein the one or more configured parameters includes at least one of an identity of a network, frequency band, the identity of a network device, or any combination thereof.

7. The device of claim 2, wherein the tag ID is encoded based on a public key of a service of a wireless network or a public key of a data clearing house.

8. The device of claim 1 wherein the shared credential comprises a public key of the application function.

9. The device of claim 1, wherein the issuer of the token comprises at least one of a service of a wireless network or a data clearing house coupled to the wireless network.

10. The device of claim 1, wherein the token is received from the application function.

11. A method for wireless communications, comprising:
receiving, from a provisioning service, a shared credential, wherein the shared credential is shared between a device and an application function of a wireless network, wherein the provisioning service is separate from the application function;
generating tag information, wherein the shared credential comprises a token, wherein the token is included in the tag information, and wherein the tag information is encoded based on a public key of an issuer of the token;
encoding a portion of the tag information based on the shared credential to generate encoded tag information; and
broadcasting the encoded tag information.

12. The method of claim 11, wherein the tag information includes a tag identifier (ID) and metadata.

13. The method of claim 12, wherein the tag ID is encoded based on the shared credential, and wherein the tag information further includes routing information.

14. The method of claim 13, wherein the tag ID is further encoded based on a freshness parameter comprising at least one a period of time, counter number, timer, or pseudo-random number.

15. The method of claim 12, wherein the tag ID is encoded based on a tag verification key, and wherein the tag verification key is generated based on the shared credential and one or more configured parameters by the application function.

16. The method of claim 15, wherein the one or more configured parameters includes at least one of an identity of a network, frequency band, the identity of a network device, or any combination thereof.

17. The method of claim 12, wherein the tag ID is encoded based on a public key of a service of a wireless network or a public key of a data clearing house.

18. The method of claim 11 wherein the shared credential comprises a public key of the application function.

19. The method of claim 11, wherein the issuer of the token comprises at least one of a service of a wireless network or a data clearing house coupled to the wireless network.

20. The method of claim 11, wherein the token is received from the application function.

21. A device for wireless communication by an application function, comprising:
   a memory system comprising instructions; and
   a processor system coupled to the memory system, the processor system configured to:
      provision a wireless device with a shared credential, wherein the shared credential is shared between the device and the wireless device, wherein the shared credential comprises a token, wherein the token is included in tag information, and wherein the tag information is encoded based on a public key of an issuer of the token;
      provide information associated with the wireless device to a service of a wireless network, wherein the service of the wireless network is separate from the device;
      receive encoded tag information from the wireless device; and
      decode at least a portion of the encoded tag information based on the shared credential to obtain tag information from the wireless device.

22. The device of claim 21, wherein the tag information includes an encoded tag identifier (ID) and metadata.

23. The device of claim 22, wherein the information associated with the wireless device provided to the service comprises at least one of:
   a list of encoded tag IDs;
   a tag verification key; and
   a request for a token for a wireless device.

24. The device of claim 23, wherein the information associated with the wireless device provided to the service comprises the list of encoded tag IDs which are valid for a period of time.

25. The device of claim 23, wherein the information associated with the wireless device provided to the service comprises a tag verification key, and wherein the processor system is further configured to:

generate the tag verification key based on the shared credential and one or more configured parameters by the application function; and
decode the encoded tag ID of the tag information based on the tag verification key.

26. A device for wireless communications by a service of a wireless network, comprising:
   a memory system comprising instructions; and
   a processor system coupled to the memory system, the processor system configured to:
      receive information associated with a wireless device from an application function of a wireless network coupled to the device, wherein the device is separate from the application function;
      receive encoded tag information from the wireless device; and
      verify the wireless device based on the received information associated with the wireless device and the encoded tag information.

27. The device of claim 26, wherein the tag information includes an encoded tag identifier (ID) and metadata.

28. The device of claim 27, wherein the information associated with the wireless device provided to the service comprises at least one of:
   a list of encoded tag IDs;
   a tag verification key; and
   a request for a token for a wireless device.

29. The device of claim 27, wherein the information associated with the wireless device received from the application function comprises a list of encoded tag IDs, and wherein the processor system is further configured to:
   store the received tag information;
   receive, from the application function, a request for the received tag information, the request including an encoded tag ID;
   determine that the encoded tag ID corresponds to a portion of the stored tag information, wherein verification of the wireless device is based on the determination that the encoded tag ID corresponds to a portion of the stored tag information; and
   provide the received tag information to the application function.

30. The device of claim 27, wherein the information associated with the wireless device received from the application function comprises a list of encoded tag IDs, and wherein the processor system is further configured to:
   store the received tag information;
   determine that the received tag information has been stored for a time period exceeding a threshold period of time without being requested by the application function; and
   discard the received encoded tag information.

* * * * *